(12) United States Patent
Kawai et al.

(10) Patent No.: US 7,134,115 B2
(45) Date of Patent: Nov. 7, 2006

(54) APPARATUS, METHOD, AND PROGRAM FOR BREAKPOINT SETTING

(75) Inventors: Masaki Kawai, Seto (JP); Takuji Kawamoto, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 730 days.

(21) Appl. No.: 10/358,827

(22) Filed: Feb. 5, 2003

(65) Prior Publication Data

US 2003/0149961 A1 Aug. 7, 2003

(30) Foreign Application Priority Data

Feb. 7, 2002 (JP) .............................. 2002-031372

(51) Int. Cl.
*G06F 9/44* (2006.01)
*G06F 9/45* (2006.01)

(52) U.S. Cl. .................. 717/124; 717/128; 717/129

(58) Field of Classification Search ........ 717/124–129, 717/136, 140, 141–143, 150–153
See application file for complete search history.

(56) References Cited

U.S. PATENT DOCUMENTS

| 5,560,009 | A * | 9/1996 | Lenkov et al. ............... 717/124 |
| 5,732,210 | A * | 3/1998 | Buzbee ........................ 714/38 |
| 5,815,714 | A | 9/1998 | Shridhar et al. |
| 6,091,896 | A * | 7/2000 | Curreri et al. .............. 717/125 |
| 6,249,906 | B1 * | 6/2001 | Levine et al. ............... 717/153 |
| 6,249,907 | B1 * | 6/2001 | Carter et al. ................ 717/129 |
| 6,286,132 | B1 * | 9/2001 | Tanaka et al. .............. 717/125 |
| 6,463,582 | B1 * | 10/2002 | Lethin et al. ............... 717/158 |
| 6,543,049 | B1 * | 4/2003 | Bates et al. ................ 717/129 |
| 6,634,020 | B1 * | 10/2003 | Bates et al. ................ 717/131 |
| 6,728,954 | B1 * | 4/2004 | Kesselman et al. ......... 717/154 |
| 6,760,903 | B1 * | 7/2004 | Morshed et al. ............ 717/130 |
| 6,795,963 | B1 * | 9/2004 | Andersen et al. ........... 717/130 |
| 7,058,928 | B1 * | 6/2006 | Wygodny et al. ........... 717/128 |
| 7,086,033 | B1 * | 8/2006 | Bates et al. ................ 717/124 |

FOREIGN PATENT DOCUMENTS

| JP | 5-204708 | 8/1993 |
| JP | 8-272648 | 10/1996 |
| JP | 2000-305812 | 11/2000 |

OTHER PUBLICATIONS

Wismuller, Debugging of globally optimized programs using data flow analysis, ACM SIGPLAN, pp. 278289, 1994.*
Tucker et al, "compiler optimization and its impact on development of real time systems", IEEE, pp. 1-6, 1998.*
Nanda et al, "Deriving object typesets in the presence of inter object references", ACM OOPSLA, pp. 77-96, 2005.*
Agosta et al, "Multi objective co exploration of source code transformation and design space archiectures for lower power embaded systems", ACM SAC, pp. 891-896, 2004.*

* cited by examiner

*Primary Examiner*—Anil Khatri

(57) ABSTRACT

Disclosed is a breakpoint setting apparatus capable of setting a breakpoint without imposing any burden on a programmer. The breakpoint setting apparatus includes an edited-line list manager 115 for managing an address of an edited line in a source code, and a breakpoint setting/disabling sub unit 106 for setting a breakpoint at the address stored in the edited-line list manager 115. The breakpoint setting apparatus automatically sets a breakpoint on each line where the programmer makes an edit without any specific instruction from the programmer.

22 Claims, 20 Drawing Sheets

FIG. 2

PRE-EDIT SOURCE CODE test.c
```
# include <stdio.h>
void foo(void)
{
    int i, j;
    j = 500;
    for (i=0; i<j; i++){
        if (i==5){
            printf(" i = 5\n" ();
            break;
        }
    }
    return;
}
```

POST-EDIT SOURCE CODE test.c
```
# include <stdio.h>
void foo(void)
{
    int i, j;
    j = 10;
    for (i=0; i<j; i++){
        if (i==5){
            printf(" i = 5\n" ();
            break;
        }
        printf(" i = %d ", j);
        printf(" next_i = %d ", i+1);
        printf(" continue\n");
    }
    return;
}
```

SET BREAKPOINT ON EDITED LINE

SET BREAKPOINT ON TOP OF ADDED LINES

FIG. 3

EDITED-LINE LIST FILE

| EDITED-LINE NO. |
|---|
| 2 |
| 4 |
| 5 |
| 6 |
| 10 |
| 11 |

FIG.8

TRANSFER-DESTINATION LINE LIST FILE

| LINE NO. | TRANSFER-DESTINATION FLAG |
|---|---|
| 1 | 1 |
| 2 | 0 |
| 3 | 0 |
| 4 | 1 |
| 5 | 0 |
| 6 | 1 |
| 7 | 1 |

FIG.13

BUG-SHEET LIST

| BUG-SHEET NO. | COMMENT | ITERATION NO. |
|---|---|---|
| 0001 | Test1.c : LINE 10, CORRECT aaa<br>Test1.c : LINE 11, CORRECT bbb<br>Test2.c : LINE 54, CORRECT xxx | 20<br>4<br>0 |
| 0002 | Test1.c : LINE 10, CORRECT aaa | 20 |
| 0004 | Test1.c : LINE 18, CORRECT ccc | 5 |
| 0005 | Test1.c : LINE 18, CORRECT ccc<br>Test1.c : LINE 22, CORRECT ddd | 5<br>12 |
| 0006 | - | - |

FIG.19

```
1   #include <stdio.h>
2
3   int main (void)
4   {
5      into i ; /*local variable i*/
6
7      for ( i =1; i<10; i++) {
8         if ( i <5)
9            printf (" i < 5") ;
10        else if ( i >5) {
11           printf (" i > 5¥n") ;
12           continue ;
13        } else
14           printf (" i =5") ;
15        printf ("¥n") ;
16     }
17     printf ("end¥n") ;
18     return 0 ;
19  }
```

FIG.20

LIST OF WORDS FIND IN EACH LINE

| LINE NO. | WORDS FIND IN EACH LINE | | | | | | | | |
|---|---|---|---|---|---|---|---|---|---|
| 1 | #include | ⟨stdio.h⟩ | | | | | | | |
| 2 | | | | | | | | | |
| 3 | int | main | ( | void | ) | | | | |
| 4 | { | | | | | | | | |
| 5 | int | i | ; | | | | | | |
| 6 | | | | | | | | | |
| 7 | for | ( | i=1 | ; | i<10 | ; | i++ | ) | { |
| 8 | if | ( | i<5 | ) | | | | | |
| 9 | printf | ( | ) | ; | | | | | |
| 10 | else | if | ( | i>5 | ) | { | | | |
| 11 | printf | ( | ) | ; | | | | | |
| 12 | continue | ; | | | | | | | |
| 13 | } | else | | | | | | | |
| 14 | printf | ( | ) | ; | | | | | |
| 15 | printf | ( | ) | ; | | | | | |
| 16 | } | | | | | | | | |
| 17 | printf | ( | ) | ; | | | | | |
| 18 | return | 0 | ; | | | | | | |
| 19 | } | | | | | | | | |

APPARATUS, METHOD, AND PROGRAM FOR BREAKPOINT SETTING

This application is based on an application No. 2002-31372 filed in Japan, the content of which is hereby incorporated by reference.

BACKGROUND OF THE INVENTION (1) Field of the Invention

The present invention relates to an improvement on a breakpoint setting function of a debugger tool used for program development.

(2) Description of the Related Art

A debugger is a type of support software used to find and correct errors or bugs in a program. A debugger provides functions of, for example, halting execution of a program at certain points in the source code, and outputting the values held in variables at the halted point. The point at which the execution of the program is made to halt is called a breakpoint.

Breakpoints are set by a programmer in a source code at points where, for example, corrections are made. Most of known debuggers allow a programmer to easily set breakpoints on a source code displayed on an editor. In one example, a programmer is allowed to set a breakpoint in a source code with a click of a mouse on any point of the source code displayed on the editor. Set breakpoints are indicated with markers or other symbols displayed on the editor.

To be more specific, a debugger inserts, for example, an interruption instruction into a program at a point corresponding to a breakpoint set by a programmer. Consequently, control is passed to the debugger at the interruption instruction so that variables or stacks at the time can be checked. To resume processing currently at a halt, the debugger deletes the interruption command from the program to bring it back into the original state, so that the program re-starts.

As above, conventional debuggers require a programmer to set breakpoints as necessary, which imposes a burden on the programmer. For example, to set a breakpoint at a point where a correction is made, a programmer is required to make a breakpoint for each correction made, or to set a breakpoint at each corrected point all at once after completing all the corrections. Both procedures impose a burden on the programmer as the former requires the programmer to go through debugging and breakpoint setting alternately, and the latter requires the programmer to remember all the corrections he has made.

SUMMARY OF THE INVENTION

In view of the limitations stated above, the present invention has an object to provide a breakpoint setting apparatus capable of setting breakpoints without requiring a programmer to make any specific operations.

To achieve the object stated above, a breakpoint setting apparatus of the present invention comprises: a loading unit operable to load an object code generated correspondingly to a source code; a storing unit operable to store information showing relation between each of components constituting the source code and a corresponding location in the object code; an acquiring unit operable to automatically acquire and store, when a specific edit is made to the source code, editing information specifying a component subjected to the specific edit; and a setting unit operable to automatically set a breakpoint in the object code at a location corresponding to the component specified by the editing information.

With the stated construction, the breakpoint setting apparatus manages information showing locations, in the source code, at which the user (also referred to as the operator or the programmer) has made an edit. Through management of the information, the breakpoint setting apparatus determines locations, in the source code, at which an edit has been made, and sets a breakpoint on each location. This eliminates the need for the operator to make an operation for breakpoint setting or for specifying a location at which a breakpoint is to be set.

Here, each component may be a line constituting the source code, and each line may be uniquely identified by a line number assigned thereto. The storing unit may store the relation between each line number of the source code and a corresponding location in the object code. The acquiring unit may acquire as the editing information a line number identifying a line, in the source code, that is subjected to the specific edit.

Further, the specific edit may be deletion of a line feed character. The breakpoint setting apparatus may further comprise an updating unit operable to update, when the source code is edited to delete a line feed character, the editing information stored in the acquiring unit so that each line number greater than the specified line number is decremented by 1.

Further, the breakpoint setting apparatus may further comprise an updating unit operable to update, when the source code is edited to add a line feed character to a top of a line, the editing information stored in the acquiring unit so that each line number not less than a line number identifying the edited line is incremented by 1.

Further, the breakpoint setting apparatus may further comprise an updating unit operable to update, when the source code is edited to add a line feed character to an end of a line, the editing information stored in the acquiring unit so that each line number greater than a line number identifying the edited line is incremented by 1.

Further, the specific edit may be addition of a line feed character to a middle of a line in the source code. The breakpoint setting apparatus may further comprise an updating unit operable to update, when the source code is edited to add a line feed character to a middle of a line, the editing information stored in the acquiring unit so that each line number greater than the specified line number is incremented by 1, and that a line number obtained by adding 1 to the specified line number is additionally stored in the editing information.

Further, the specific edit may be a modification of a character string without any modification to a line feed character.

With the stated constructions, the breakpoint setting apparatus always determines locations, in the source code, at which an edit has been made even in the case where the edit involves a deletion of a line feed character, or addition of line feed character to a top, middle, or end of a line so that lines constituting the source code increases or decreases. Consequently, the breakpoint setting apparatus sets breakpoints at appropriate locations without specific user operation for breakpoint setting or for specifying a location at which a breakpoint is to be set.

Further, the source code may be made up of control blocks which in turn made up of a plurality of lines. The acquiring unit may further store block-boundary information showing boundaries of each control block, each boundary being specified by a line number. The setting unit may set a breakpoint in the object code at a location corresponding to a first line of each control block shown by the block-boundary information.

With the stated construction, the breakpoint setting apparatus sets a breakpoint only on an edited line that first appears in each control block.

Further, the setting unit may set, when the editing information stored in the acquiring unit includes a plurality of consecutive line numbers, a breakpoint in the object code only at a location corresponding to a first line number of the plurality line numbers.

With the stated construction, when more than two consecutive lines in the source code have been edited, the breakpoint setting apparatus sets a breakpoint only on the first line of the consecutive, edited lines.

Further, the breakpoint setting apparatus may further generate a bug-sheet for each breakpoint set by the setting unit, and presents the generated bug-sheet to a user through a user interface. The bug-sheet includes user-inputted information regarding an edit made to the source code at a component corresponding to the breakpoint.

With the stated construction, the breakpoint setting apparatus manages information showing locations, in the source code, at which the user has made an edit. Through management of the information, the breakpoint setting apparatus determines locations, in the source code, at which an edit has been made, and sets a breakpoint on each location. In addition, the breakpoint setting apparatus generates a bug-sheet for each breakpoint. This eliminates the need for the operator to generate a bug-sheet, thereby reducing the burden imposed on the operator.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a view showing one example of a breakpoint displayed by a breakpoint displayer 109;

FIG. 3 is a view showing one example of an edited-line list;

FIG. 8 is a view showing one example of a transfer-destination line list generated and used by the debugging apparatus 20;

FIG. 13 is a view showing one example of a bug-sheet list;

FIG. 19 is a view showing an example of a program; and

FIG. 20 is a view showing an example in which a source code is divided into words.

DESCRIPTION OF THE PREFERRED EMBODIMENT

Embodiment 1

Hereinafter, description is given to a debugging apparatus according to an embodiment 1 of the present invention with reference to the accompanying drawings.

Figure 1:
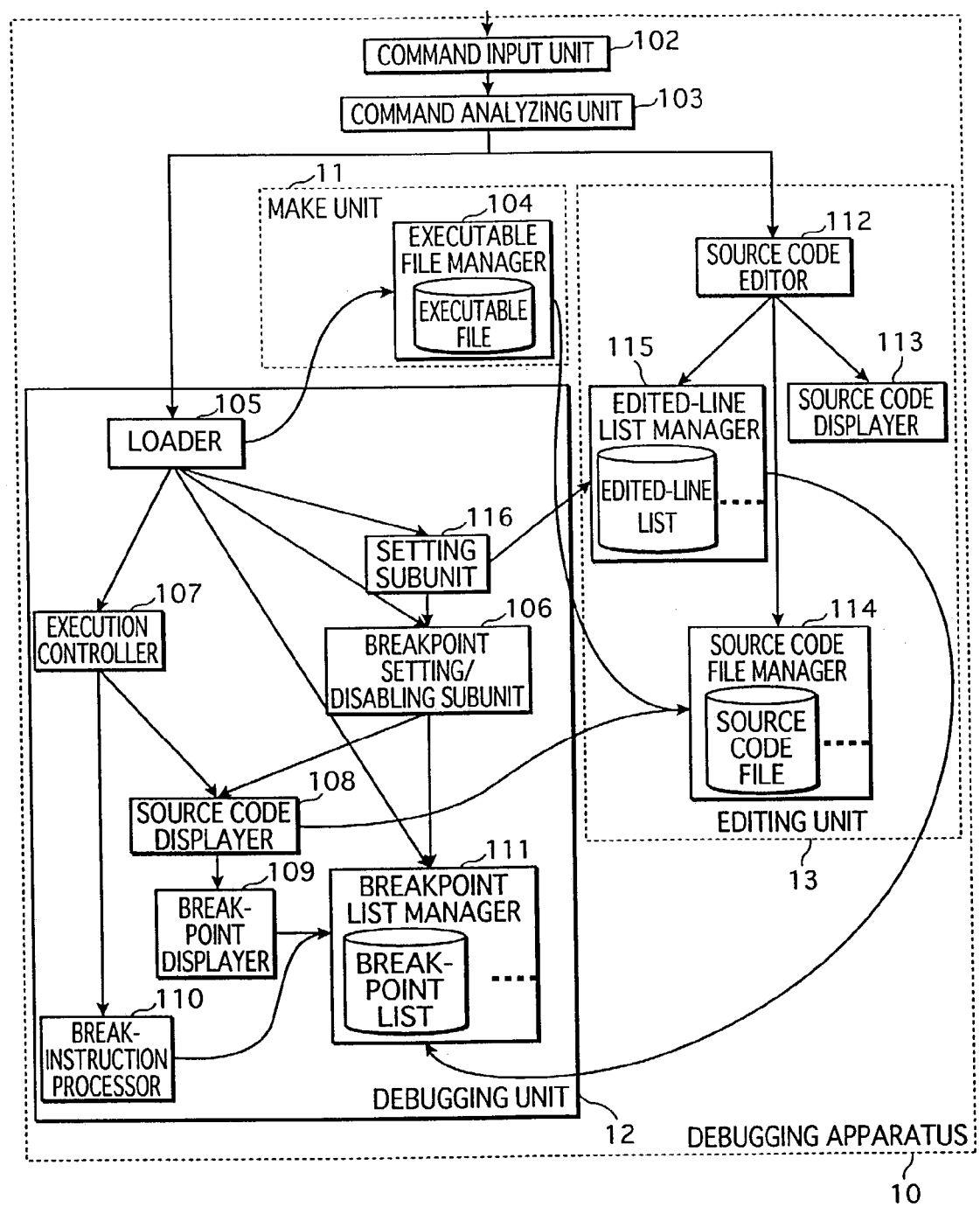
FIG. 1 is a block diagram of a debugging apparatus according to an embodiment 1 of the present invention.

FIG. 1 is a block diagram showing a debugging apparatus 10 of the embodiment 1.

In the figure, the debugging apparatus 10 is composed of a command input unit 102 for receiving a command that is externally inputted by an operator, a command analyzing unit 103 for analyzing the command, a make unit 11 for performing make processing, a debugging unit 12 for performing debugging, and an editing unit 13 for performing editing.

The make unit 11 includes an executable file manager 104 for generating and storing a most up-to-date version of an executable file.

The debugging unit 12 includes a loader 105 for loading a most-update version of the executable file, a breakpoint setting/disabling sub unit 106 for setting and disabling a breakpoint, an execution controller 107 for controlling execution of the executable file, a source code displayer 108 for displaying a source code on e.g., a display screen, a breakpoint displayer 109 for displaying a mark indicating where in the source code a breakpoint is set, a break instruction processor 110 for performing predetermined processing when execution of the program comes to a halt at a breakpoint, a breakpoint list manager 111 for storing information regarding currently set breakpoints, and a setting sub unit 116 for automatically setting a breakpoint at a point where in the source code some edit is made, i.e., where modification, addition, or deletion is made. Hereinafter, a change to the source code, i.e., alternation, addition, or deletion of the source code, made by the operator is referred to as an edit or a modification of the source code.

The editing unit 13 includes a source code editor 112 for editing a source code according to an edit command inputted by the operator, an edited-line list manger 115 for storing the file name of the source code and the line number to which an edit is made, a source code displayer 113 for displaying a read source code on e.g., a display screen, and a source code file manager 114 for storing source code files.

Here, it may be applicable that the source code displayer 108 and the source code displayer 113 included in the editing unit 13 and the debugging unit 12, respectively, may be the same one that is commonly used as both.

The command input unit 102 receives from the operator commands such as an "edit-file open command", "edit-file save command", "edit command", "debug start command", "breakpoint set command", "breakpoint disable command", "program execution command", and "debug termination command". Note that commands for display processing and related setting are not particularly relevant to the present invention, thus description thereof is omitted.

The command analyzing unit 103 analyzes a command received by the command input unit 102, and controls each unit and component based on the analysis, so that the command is executed.

Hereinafter, description is first given to conventionally known commands of the "edit-file open command", "edit-file save command", "breakpoint set command", "breakpoint disable command", and "program execution command". Since these commands are part of the prior art, description is given briefly without presenting drawings. Description is then given with reference to the drawings to the "edit command", "debug start command", and "debug termination command", which are the commands in which features of the present invention reside.

<Edit-File Open Command>

Step 11: The command input unit 102 receives from the operator an edit-file open command specifying the name of a source code file to be edited.

Step 12: The source code editor 112 requests the source code file manager 114 to read the source code in the specified file.

Step 13: The source code file manager 114 reads the requested source code from a recording medium storing source code files, and passes the read source code to the source code editor 112.

Step 14: The source code editor 112 requests the source code displayer 113 to display the read source code.

Step 15: The source code displayer 113 displays the requested source code on a display screen.

<Edit-File Save Command>

Step 31: The command input unit 102 receives from the operator an edit-file save command specifying the name of a source code file to be saved.

Step 32: The source code editor 112 requests the source code file manager 114 to save the source code corresponding to the specified file name.

Step 33: The source code file manager 114 writes the requested source code in the recording medium. <Breakpoint Set Command>

Step 51: The command input unit 102 receives from the operator a breakpoint set command specifying the name of a source code file and a line number where a breakpoint is to be set. To be more specific, the breakpoint set command is entered by the operator by clicking a mouse with the mouse pointer pointing any line of the source code being displayed on the screen. In response, the command input unit 102 receives the breakpoint set command specifying the line number and the file name of the source code being displayed.

Step 52: The loader 105 requests the breakpoint setting/disabling sub unit 106 to set a breakpoint as specified.

Step 53: The breakpoint setting/disabling sub unit 106 makes reference to debug information in the executable file having been loaded so as to acquire an address showing where in the executable file the breakpoint is to be set.

Step 54: The breakpoint setting/disabling sub unit 106 requests the breakpoint list manager 111 to record, into a breakpoint list, the thus acquired address and an instruction residing in the executable file at the address.

The breakpoint list is composed of an address column for storing addresses each specifying where in the executable file a breakpoint is set, and an instruction column for temporarily storing instruction each residing at an address stored in the address column. Further, each address and a corresponding instruction are listed in ascending order.

Step 55: The breakpoint setting/disabling sub unit 106 requests the source code displayer 108 to display the source code with breakpoints in a manner reflecting the currently performed command processing.

Step S56: The breakpoint list manager 111 records, into the breakpoint list, the address that is requested by the breakpoint setting/disabling sub unit 106 together with a corresponding instruction. Successively, the breakpoint list manager 111 modifies the source code so that the instruction residing at the address is replaced with a break instruction.

Step 57: The source code displayer 108 reads, from the source code manager 114, the source code file requested to be displayed, and displays the source code. In addition, the source code displayer 108 requests the breakpoint displayer 109 to display the breakpoints currently set in the specified file.

Step 58: The breakpoint displayer 109 reads, from the breakpoint list manager 111, the breakpoint list for the specified source code file and displays breakpoints according to the breakpoint list.

FIG. 2 shows, as one example, breakpoints displayed by the breakpoint displayer 109.

As shown in the figure, the line that reads "j=500" in the pre-edit source code is changed to "j=10", and lines that read "printf("i=% d",i):", "printf("next_i=% d", i+1);", and "printf("continue¥n";" are added. As a result, in the post-edit source code, a black dot representing a breakpoint is displayed at the left of the line that reads "j=10", and also at the left of the line that reads "printf("i=% d,i);".

<Breakpoint Disable Command>

Step 61: The command input unit 102 receives from the operator a breakpoint disable command specifying a breakpoint is to be disabled by the name of a source code file and the line number. To be more specific, the breakpoint disable command is entered by the operator by clicking a mouse with the mouse pointer pointing any breakpoint set on a line of the source code being displayed on the screen. In response, the command input unit 102 receives the breakpoint disable command for disabling the breakpoint set on the line.

Step 62: The loader 105 requests the breakpoint setting/disabling sub unit 106 to disable the breakpoint.

Step 63: The breakpoint setting/disabling sub unit 106 makes reference to the debug information in the executable file having been loaded so as to acquire an address showing where in the executable file the specified breakpoint resides. The breakpoint setting/disabling sub unit 106 then requests the breakpoint list manager 111 to delete, from the breakpoint list, the address of the breakpoint to be disabled along with a corresponding instruction. Further, the breakpoint setting/disabling sub unit 106 requests to the source code displayer 108 to display the source code with breakpoints in a manner reflecting the currently performed command processing.

Step 64: The breakpoint list manager 111 modifies the executable file so that the instruction once replaced by a break instruction is restored back into the original location, and then deletes the address and the instruction from the breakpoint list.

Step 65: The source code displayer 108 reads the requested source code file from the recording medium in the source code file manager 114, and displays the thus read source code file. The source code displayer 108 then requests the breakpoint displayer 109 to display breakpoints currently set in the specified source code file.

Step 66: The breakpoint displayer 109 reads the breakpoint list from the breakpoint list manager 111, and displays the breakpoint according to the breakpoint list.

<Program Execution Command>

Step 71: The command input unit 102 receives from the operator a program execution command so that the debugging apparatus 10 executes the executable file.

Step 72: The loader 105 requests the execution controller 107 to execute the executable file.

Step 73: The execution controller 107 interprets the executable file on an instruction-by-instruction basis to execute. When encountering a break instruction, the execution controller 107 halts execution, and requests the break instruction processor 110 to perform the break instruction. In succession, the execution controller 107 requests the source code displayer 108 to display a part of a source code corresponding to where the execution is made to halt.

Step 74: The break instruction processor 110 fetches, from the breakpoint list manager 111, the instruction that is originally located at the address where the execution is made to halt, and passes the fetched instruction to the execution controller 107 as the first instruction to be executed when the program re-starts.

Step 75: The source code displayer 108 reads the requested source code file from the source code file manager 114 to display. Then, the breakpoint displayer 109 reads the breakpoint list for the specified source code file, and displays marks each representing a breakpoint at corresponding locations on the source code.

Now, description is given to an edited-line list before description is given to the commands where the features of the present invention reside.

FIG. 3 is a view showing one example of the edited-line list.

The edited-line list is a table of line numbers each corresponding to a line in the source code where the operator has made an edit. Thus, the line numbers stored in the table are where breakpoints are to be set. In the table, the line numbers are listed in ascending order, and no number is possibly stored in duplicate, and the table is generated and stored separately for each source code file.

Now, description is given to the "edit command", "debug start command", and "debug termination command".

<Edit Command>

Figure 4:
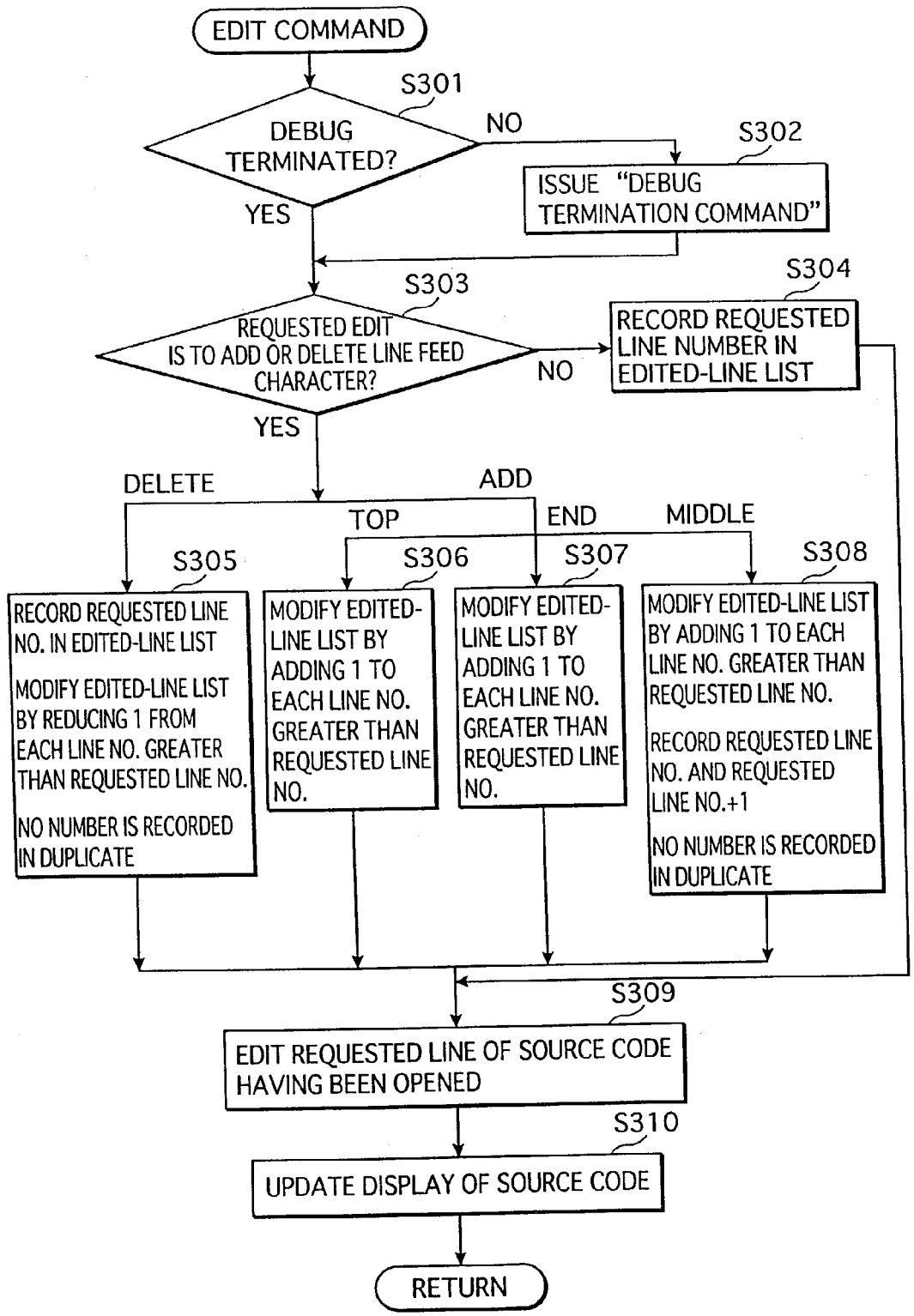
FIG. 4 is a flowchart showing processing performed in response to an edit command received by a command input unit 102.

FIG. 4 is a flowchart showing processing performed in response to an edit command received by the command input unit 102. An edit command is valid when a source code file is being displayed by an edit-file open command.

Step S301: The source code editor 112 judges whether debugging has been terminated.

Step S302: When it is judged in the step S301 that the debugging is not yet terminated, the source code editor 112 issues a "debug termination command" to the command input unit 102, so that debugging is terminated.

Step S303: The source code editor 112 judges whether the edit requested to be made is either deletion or addition of a line feed character. The deletion of a line feed character refers not only to a deletion of a line feed character alone but also to any edit involving a deletion of a line feed character. Further, the addition of a line feed character refers not only to an addition of a line feed character alone but also to any edit involving an addition of a line feed character. Naturally, there is an edit that is not either of the above edits, which are edits that can be made without any deletion and addition of a line feed character.

Step S304: When the edit has nothing to do with a line feed character, the source code editor 112 simply records into the edited-line list the line number corresponding to the line in which the edit is requested to be made.

Step S305: When the edit is to delete a line feed character, the source code editor 112 first records in the edited-line list the line number corresponding to the line in which the edit is to be made, and then modifies the edited-line list so that each line number greater than the newly recorded line number is reduced by 1.

Step S306: When the edit is to add a line feed character at the top of a line, the source code editor 112 modifies the edited-line list so as to increment by 1 each line number not less than the requested line number, i.e., than the line number corresponding to the line requested to be edited.

Step S307: When the edit is to add a line feed character at the end of a line, the source code editor 112 modifies the edited-line list so as to increment by 1 each line number greater than the requested line number.

Step S308: When the edit is to add a line feed character somewhere in the middle of a line, i.e., neither at the top nor at the end of the line, the source code editor 112 modifies the edited-line list so as to increment by 1 each line number greater than the requested line number. In addition, the source code editor 112 records, into the edited-line list, the requested line number and another line number obtained by the requested line number +1.

Step S309: The source code editor 112 makes the requested edit to the source code being displayed, and then requests the source code displayer 108 to update the display of the source code.

Step S310: The source code displayer 108 updates the display of the source code correspondingly to the edit made.

In the manner stated above, the source code editor 112 records, in the edited-line list, line numbers of edited lines, thereby managing locations of where in the source code edits are made.

In the present embodiment, editing of a source code is monitored at all times so that the edited-line list is updated each time an edit is made. Yet, the present invention is not limited thereto, and it is applicable to generate an edited-line list by comparing the pre-edit source code and the post-edit source code after all editing is made.

<Debug Start Command>

Figure 5:
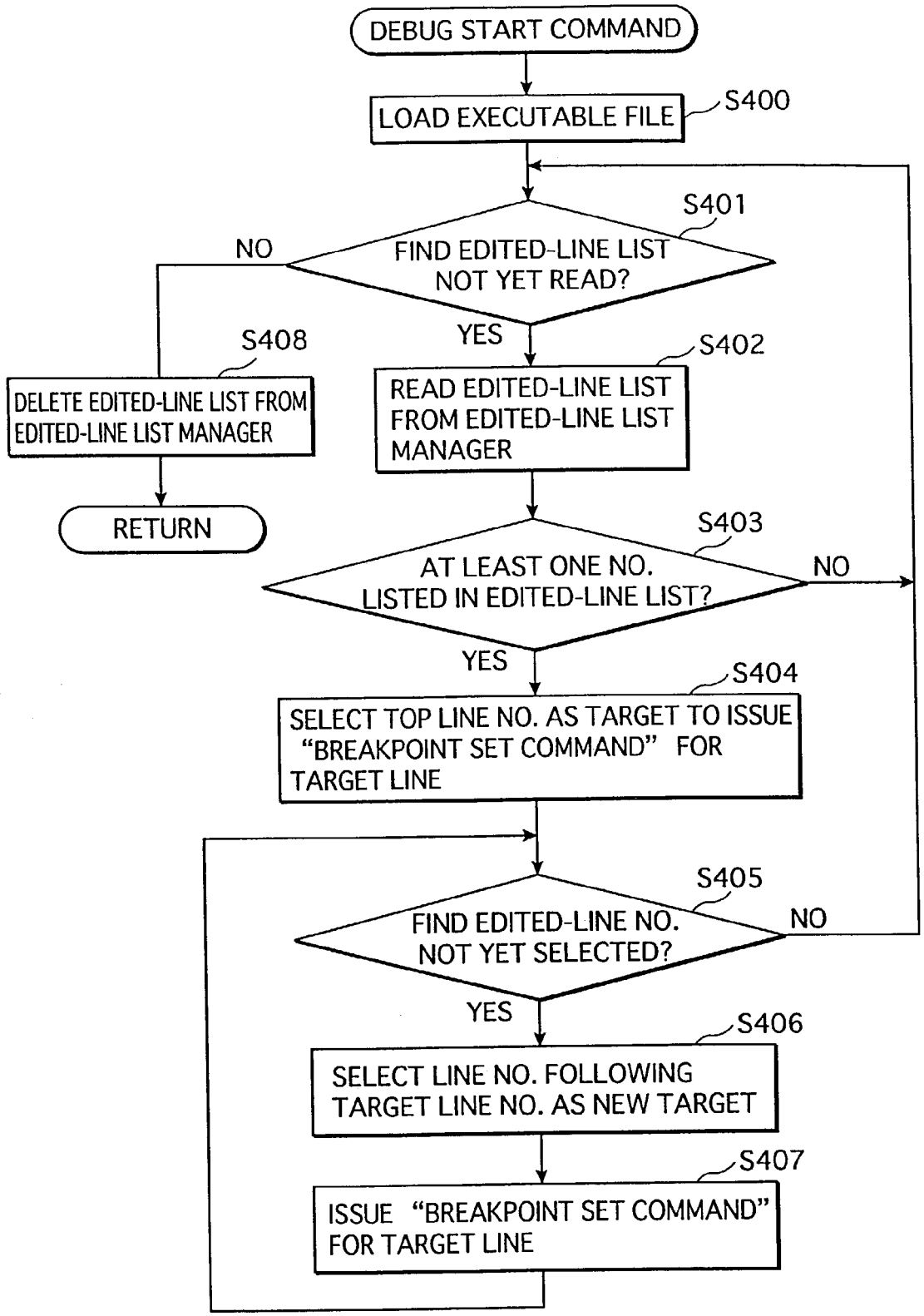
FIG. 5 is a flowchart showing processing performed in response to a debug start command received by the command input unit 102.

FIG. 5 is a flowchart showing processing performed in response to a debug start command received by the command input unit 102. Note that although omitted in FIG. 5, the following steps S41–S43 are performed prior to a step S400.

Step S41: When there is a source code currently being edited, the loader 105 issues an edit-file save command to save the source code. The loader 105 then requests the executable file manager 104 to read a most up-to-date version of the executable file.

Step S42: The executable file manager 104 makes reference to the source code manager 114 for the date and time of the source code file so as to judge whether there is a source code file that is generated or modified after a most up-to-date version of the executable file is generated.

Step S43: When it is judged in the step S42 that there is such a source code file, the executable file manager 104 compiles the source code to generate a most up-to-date version of the executable file, and passes the thus generated executable file to the loader 105.

On the other hand, when it is judged in the step S42 that there is no such a source code file, the executable file manager 104 passes to the loader 105 an executable file that is a most up-to-date version among existing executable files.

Step S400: The loader 105 loads the passed executable file, and requests the setting sub unit 116 to set a breakpoint at each corresponding line in the executable file to the line numbers listed in the edited-line list.

Step S401: The setting sub unit 116 judges whether the edited-line list manager 115 includes an edited-line list that has not yet been read.

Step S402: When it is judged that there is such an edited-line list, the setting sub unit 116 reads that edited-line list.

Step S403: The setting sub unit 116 judges whether the read edited-line list includes at least one line number.

Step S404: When it is judged that there is at least one line number, the setting sub unit 116 selects a line number listed at the top of the edited-line number list as a target. The setting sub unit 116 issues a breakpoint set command so that a breakpoint is set in the source code on the line specified by the target line number.

Step S405: The setting sub unit 116 checks each line number listed in the edited-line list one by one from the top so as to judge whether there is a line number not yet selected as a target.

Step S406: When it is judged there is a line number not yet selected, the setting sub unit 116 selects, as a next target, a line number that follows a current target line number.

Step S407: The setting sub unit 116 issues a breakpoint setting command, so that a breakpoint is set in the source code on the line of specified by the target line number.

Step S408: When completing breakpoint setting on every edited line, the setting sub unit 116 deletes the edited-line list from the edited-line list manager 115.

In the manner described above, the setting sub unit 116 sequentially issues a breakpoint setting command specifying each line number listed in the edited-line number list, so that the breakpoint setting/disabling sub unit 106 sets a breakpoint on a line corresponding to the specified line number.

In the above description, the edited-line list is deleted after the predetermined processing. Instead, it is applicable to deleted an unnecessary portion of the breakpoint list immediately before an edited-line list is generated based on the breakpoint list in the processing of a debug termination command.

<Debug Termination Command>

Figure 6:
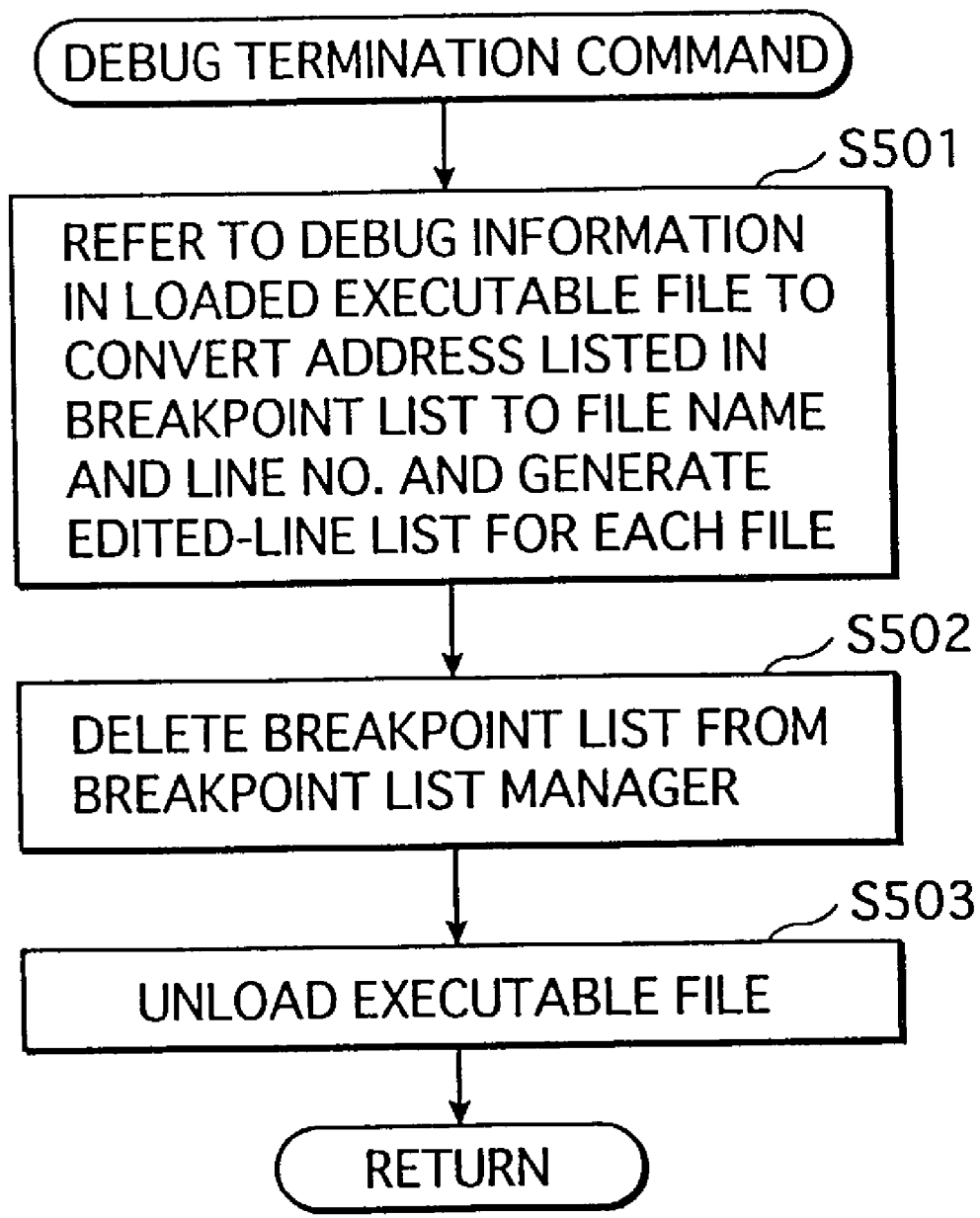
FIG. 6 is a flowchart showing processing performed in response to a debug termination command received by the command input unit 102.

FIG. 6 is a flowchart showing processing performed in response to a debug termination command received by the command input unit 102.

Step S501: The loader 105 requests the edited-line list manager 115 to generate an edited-line list based on the breakpoint list stored in the breakpoint list manager 111. In response, the edited-line list manager 115 makes reference to the debug information in the loaded executable file so as to convert the address of each breakpoint listed in the breakpoint list to a file name and a line number corresponding to the breakpoint. The edited-line list manager 115 then generates an edited-line list for each file.

Step S502: The loader 105 requests the breakpoint list manager 111 to delete the breakpoint list, so that the breakpoint list manager 111 deletes the breakpoint list.

Step S503: The loader 105 unloads the executable file.

With the arrangement stated above, the programmer is no longer required to set a breakpoint on a line where he has made some edit. Consequently, the programmer is freed from the burdensome procedure of breakpoint setting, so that debugging is performed with efficiency. Further, when breakpoints are set manually by the programmer, the programmer may fail to set a breakpoint for every line that is edited. On the contrary, breakpoint setting by the debugging apparatus 10 ensures that a breakpoint is set on all the edited line, so that execution of the program is checked at every necessary point.

Embodiment 2

Figure 7:
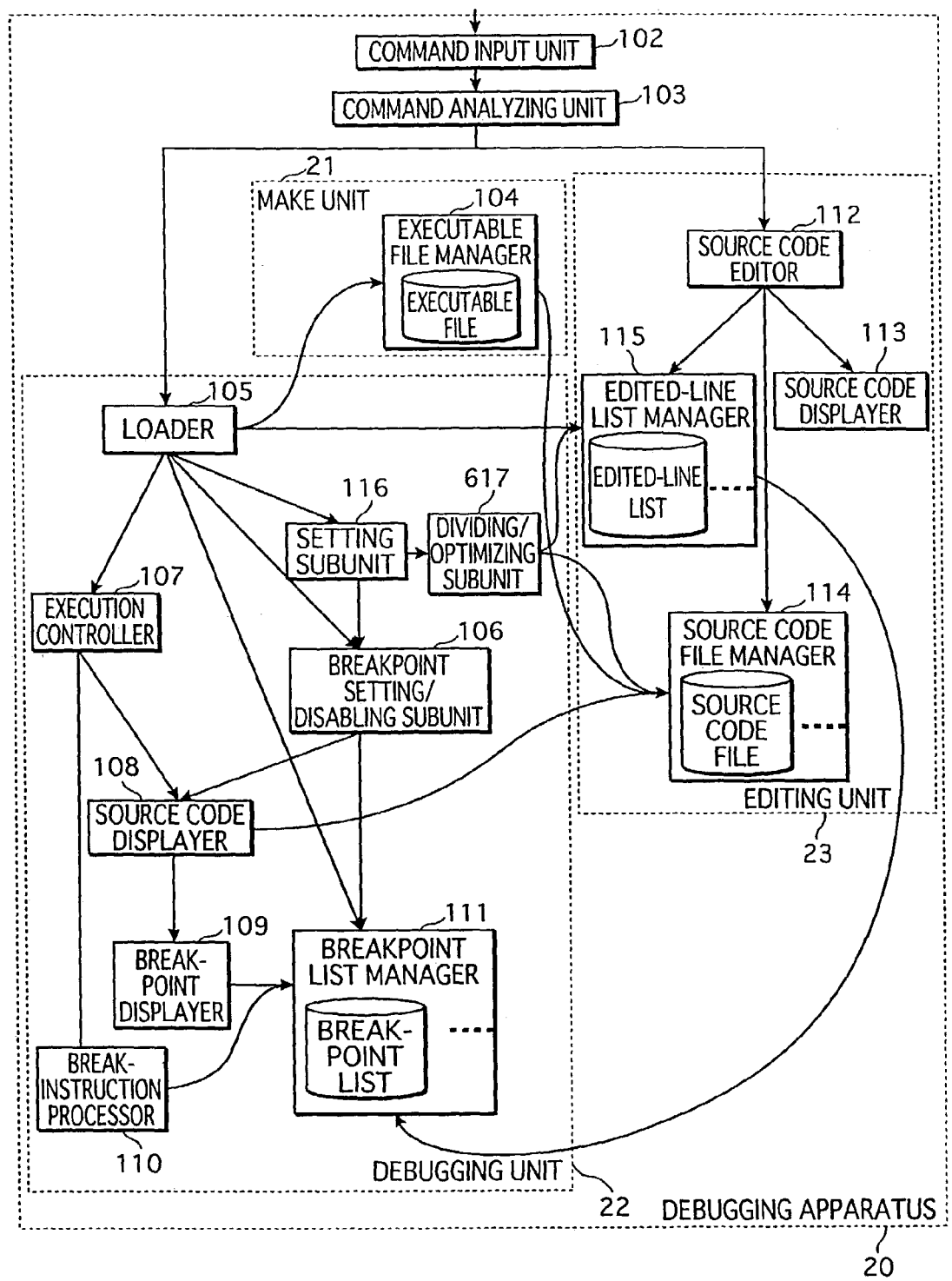
FIG. 7 is a block diagram showing a debugging apparatus 20 according to an embodiment 2 of the present invention.

FIG. 7 is a block diagram showing a debugging apparatus 20 according to an embodiment 2 of the present invention.

In the figure, the debugging apparatus 20 includes a dividing/optimizing sub unit 617 additionally to the components of the debugging apparatus 10. Hereinafter, description is given mainly to where the difference is found, while description to the similar construction to the debugging apparatus 10 is omitted.

Figure 9:
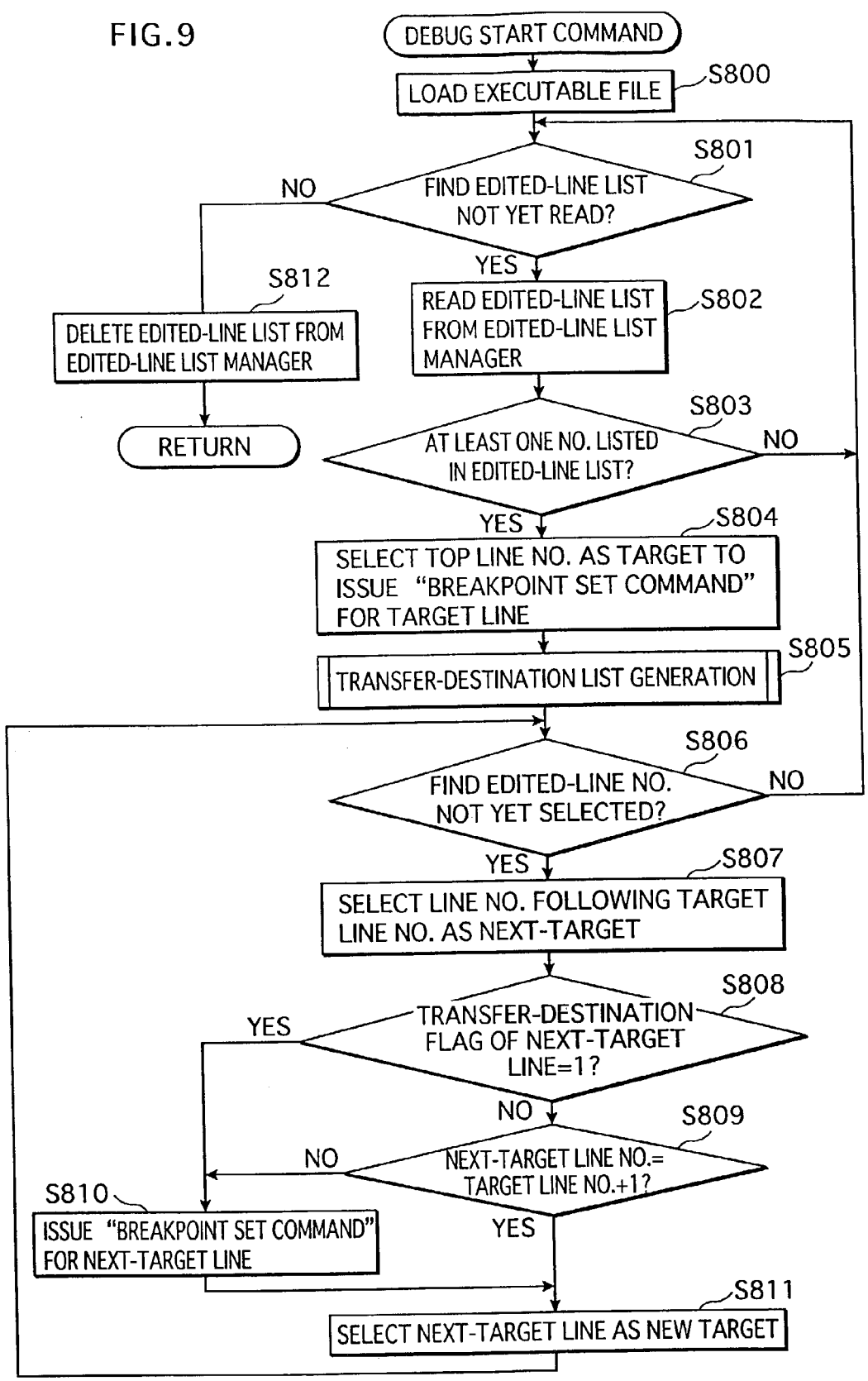
FIG. 9 is a flowchart showing processing performed in response to a debug start command received by the command input unit 102.

FIG. 9 is a flowchart showing processing performed in response to a debug start command received by the command input unit 102.

Note that although omitted in FIG. 9, the steps S41–S43 described above with reference to FIG. 5 are performed prior to a step S800. In addition, steps S800–S804 and S812 are basically similar respectively to the steps S400–S404 and S408 shown in FIG. 5. Thus, description to those steps is omitted. Hereinafter, description is given to a step S805 and following steps.

Step S805: The dividing/optimizing subunit 617 generates a transfer-destination line list. The details of this step are given later with reference to FIG. 10.

Here, description is given to the transfer-destination line list.

FIG. 8 is shows one example of a transfer-destination line list generated and used by the debugging apparatus 20 of the present embodiment.

A transfer-destination line refers to a line which may be executed following a line other than the one listed in the source code immediately above that line. One example of a transfer-destination line is a line designated as a branch target of a branch instruction. In the source code starting from the top line, a set of lines including a transfer-destination line and lines residing between the transfer-destination line and another transfer-destination line is collectively referred to as a control block. The transfer-destination line list atom a line number showing where in the source code the first line of each control block resides, so that the boundaries of each control block are shown.

The transfer-destination line list shown in FIG. 8 is composed of a column storing line numbers and a column storing transfer-destination flags each indicating whether a corresponding line is a transfer-destination line. When a corresponding line is a transfer-destination line, the transfer-destination flag is set to "1", and otherwise set to "0". Note that the first line of the source code is always designated as a transfer-destination line. The transfer-destination line list is generated for each source code file.

Step S806: The setting subunit 116 checks each number in the edited-line list one by one from the top to judge whether there is a line number not yet selected as a target.

Step S807: When it is judged that there is a line number not yet selected as a target, the setting subunit 116 selects, as a next-target, a line number listed following a currently selected target line number.

Step S808: The setting subunit 116 makes reference to the transfer-destination line list to judge whether the transfer-destination flag corresponding to the next-target is set to "1".

Step S809: When the judgment in the step S808 results in negative, the dividing/optimizing subunit 617 judges whether the line number of the next-target is equal to the value obtained by adding 1 to the line number of the currently selected target. This is to judge whether the current target line and the next-target line are two consecutive lines.

Step S810: When the judgment in the step S808 results in affirmative or when the judgment in the step S809 results in negative, the dividing/optimizing subunit 617 issues a breakpoint setting command so that a breakpoint is set in the source code on the next-target line.

Step S811: The dividing/optimizing subunit 617 now selects the next-target line as a target line, and goes back to the step S806.

In the manner stated above, the dividing/optimizing subunit 617 sets a breakpoint on an edited line that is a transfer-destination line or on an edited line of which line number is inconsecutive in the edited-line list to the line number of an immediately preceding edited line. In other words, the dividing/optimizing subunit 617 sets a breakpoint neither on an edited line that is a transfer-destination nor on an edited line of which line number is consecutive to that of an immediately preceding edited line.

Note that the dividing/optimizing subunit 617 may be simplified in construction as follows. That is, the dividing/optimizing subunit 617 may be constructed so as to set a breakpoint on each line that is listed in the edited-line list and whose transfer-destination flag in the transfer-destination line list is set to 1. Further, the dividing/optimizing subunit 617 may be constructed so as not to set a breakpoint on an edited line that immediately follows in the source code another edited line.

Alternatively, the dividing/optimizing subunit 617 may be constructed so as to set a breakpoint only on the first edited line in each control block.

Further, the dividing/optimizing subunit 617 may be constructed so as to set a breakpoint on the first line of a control block in the case the control block includes an edited line. Here, it is omitted to set a breakpoint on edited lines other than the one at the top of the control block. Alternatively, the dividing/optimizing subunit 617 may be constructed to set a breakpoint only on the first line of more than two edited lines that consecutively reside in a control block.

Figure 10:
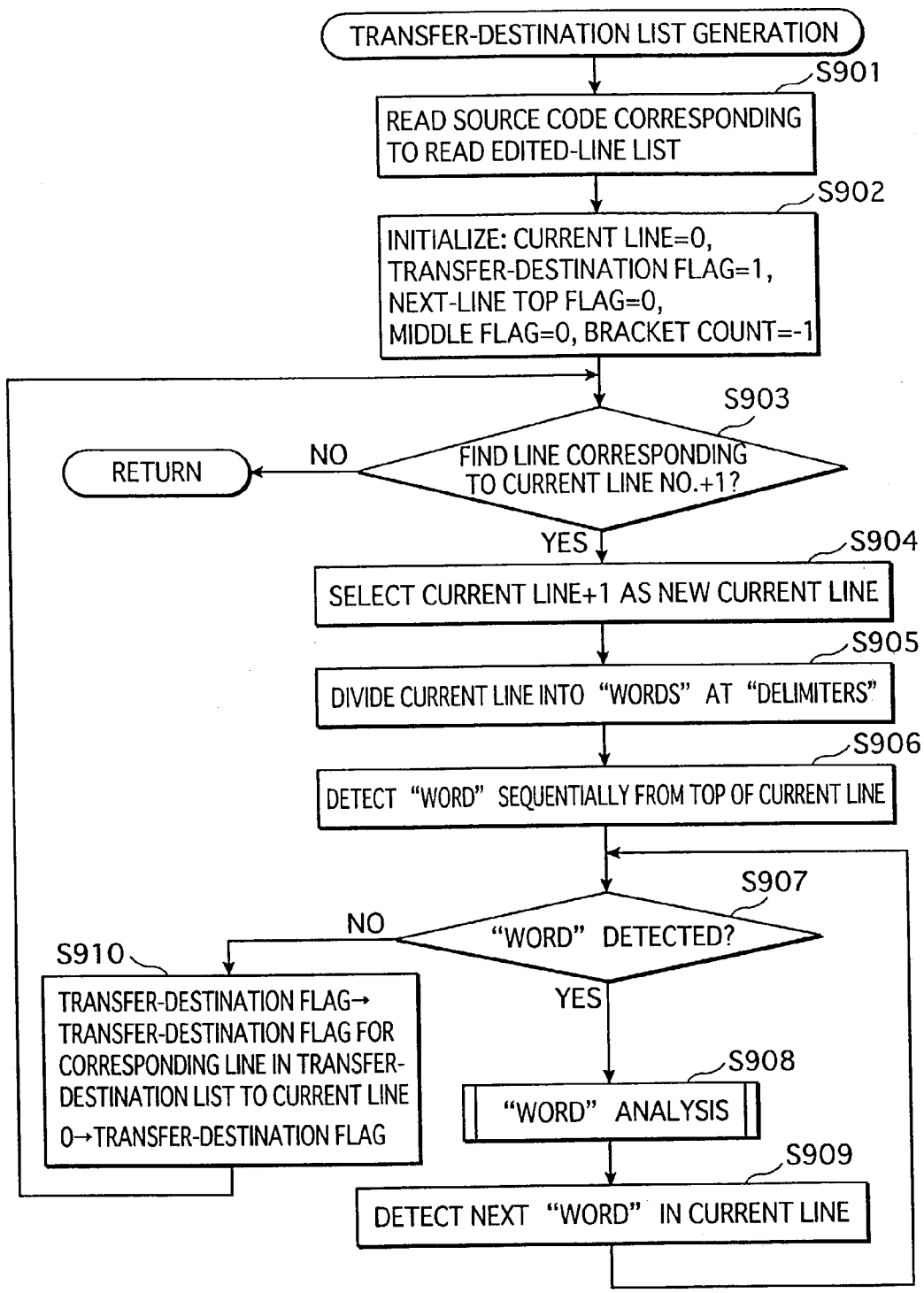
FIG. 10 is a flowchart showing the detailed processing performed in a step S805 for generating a transfer-destination line list.

FIG. 10 is a flowchart showing the detailed processing performed in the step S805 for generating the transfer-destination line list.

Step S901: The dividing/optimizing subunit 617 reads the source code for the edited-line list that has been read.

Step S902: The dividing/optimizing subunit 617 initializes each variable in preparation for a word analysis to be performed later. To be more specific, the dividing/optimizing subunit 617 sets a current line to 0, a transfer-destination flag to 1, a next-line top flag to 0, a middle flag to 0, and a bracket count to −1.

Step S903: The dividing/optimizing subunit 617 judges whether there is a line, in the source code, corresponding to the line number obtained by "the current line +1".

Step S904: When it is judged in the step S903 that there is a line corresponding to the current line +1, the dividing/optimizing subunit selects that line as a current line.

Step S905: The dividing/optimizing subunit 617 divides the current line into words at delimiters.

Here, the delimiters are predetermined character strings includes the following.

(1) space
(2) control character
(3) // . . . end of line
(4) /* . . . */
(5) " . . . "
(6) (,)
(7) {,}
(8) :

Note that " . . . " used herein indicates an arbitrary character string. Of the above delimiters, (6), (7), and (8) are especially referred to as word delimiters. Each word is constituted by (i) a character or a character string that is divided by delimiters and (ii) the delimiters. FIGS. 19 and 20 separately shows an example in which a source code is divided into words.

Step S906: The dividing/optimizing subunit 617 detects a word sequentially from the top of the current line.

Step S907: The dividing/optimizing subunit 617 judges whether any word is detected.

Step S908: If it is judged in the step S907 that a word is detected, the dividing/optimizing subunit 617 performs the word analysis, which will be described later in detail with reference to FIG. 11A.

Step S909: The dividing/optimizing subunit 617 continues to detect the current line for another word, and goes back to the step S907.

Step S910: When it is judged in the step S907 that no word is detected, the dividing/optimizing subunit 617 assigns the value held in the transfer-destination flag to a transfer-destination flag corresponding to the current line, followed by setting the transfer-destination flag to 0. Then, the processing goes back to the step S903.

FIG. 11A is a flowchart showing details of the word analysis performed in the step S908. In the word analysis, each word is classified into groups 1–6 and an "other" group, and subjected to different processing depending on the classification. FIG. 11B shows words classified in the groups 1–6.

Step S1001: The dividing/optimizing subunit 617 judges whether the bracket count is greater than −1.

Step S1008: When it is judged in the step S1001 that the bracket count is not greater than −1 and that the word is classified into the group 1, i.e., the word includes either ":" or "}", the dividing/optimizing subunit 617 sets the next-line top flag to 1.

Step S1009: When it is judged in the step S1001 that the bracket count is not greater than −1 and that the word is classified into the group 2, the dividing/optimizing subunit 617 sets the bracket count to 0 and the middle flag to 1.

Step S1010: When it is judged in the step S1001 that the bracket count is not greater than −1 and that the word is classified into the group 3, the dividing/optimizing subunit 617 sets both the next-line top flag and the middle flag to 1.

Step S1011: When it is judged in the step S1001 that the bracket count is not greater than −1 and that the word is classified into the group 5, the dividing/optimizing subunit 617 sets the middle flag to 0.

Step S1012: When it is judged in the step S1001 that the bracket count is not greater than −1 and that the word is classified into the group 4, the dividing/optimizing subunit 617 further judges whether the next-line top flag is set to 1.

Step S1013: When it is judged in the step S1012 that the next-line top flag is set to 1, the dividing/optimizing subunit 617 sets the transfer-destination flag to 1, and the next-line to flag to 0.

Step S1014: The dividing/optimizing subunit 617 then judges whether the middle flag is set to 1.

Step S1015: When it is judged in the step S1014 that the middle flag is set to 1, the dividing/optimizing subunit 617 sets the next-line top flag to 1 and the middle flag to 0.

Note that when it is judged in the step S1001 that the bracket count is not greater than −1 and the word does not fall into any of the groups 1–5, no additional processing is performed.

Step S1002: When it is judged in the step S1001 that the bracket count is greater than −1, the dividing/optimizing subunit 617 judges whether the word is classified into the group 6.

Step S1003: When it is judged in the step S1002 that the word is classified into the group 6, the dividing/optimizing subunit 617 further judges whether the word includes "(".

Step S1004: When it is judged in the step S1003 that the word includes "(", the dividing/optimizing subunit 617 increments the bracket count by 1.

Step S1005: When it is judged in the step S1003 that the word does not include "(", the dividing/optimizing subunit 617 decrements the bracket count by 1.

Step S1006: The dividing/optimizing subunit 617 judges whether the bracket count is equal to 0.

Step S1007: When it is judged in the step S1006 that the bracket count is equal to 0, the dividing/optimizing subunit 617 sets the bracket count to −1.

Note that the above classification of the groups 1–6 is suitable for a source code written in the C language. To be suitable for a source code is written in Java, the group 1 additionally includes "catch" and "finally".

Figure 11:
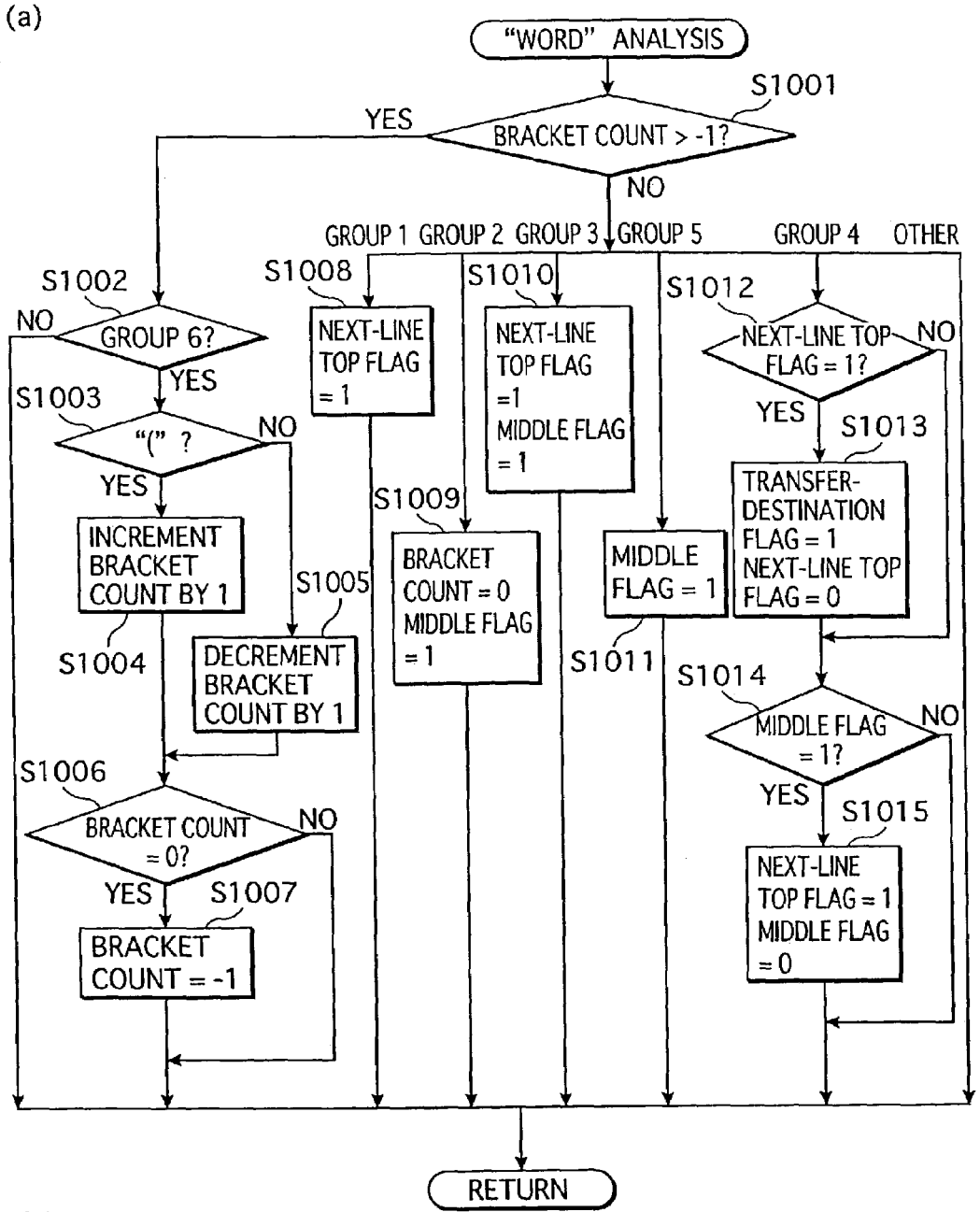
FIG. 11A is a flowchart showing details of a word analysis performed in a step S908.
FIG. 11B is a view showing words classified in groups 1–6

In the flowcharts shown in FIGS. 10 and 11, words are sequentially analyzed from the top of the source code, and a line is determined as a transfer-destination in either of the following two Cases 1 and 2.

Case 1: The dividing/optimizing subunit 617 sequentially analyzes words from the beginning of the source code. To be selected is a line in which the word ";" in the group 4 first appears after the word ":" or "}" in the group 1 or the word "else" in the group 3 appears. The thus selected line is designated as a transfer-destination.

Case 2: The dividing/optimizing subunit 617 sequentially analyzes words from the beginning of the source code. To be selected is a line in which the word ";" in the group 4 first appears after the word ";" in the group 4 appears under the state where the middle flag is set to 1. The thus selected line is designated as a transfer-destination.

Here, the state where the middle flag is set to 1 indicates that one of the words in the groups 3 or 4, i.e., "if", "for", "while" and "else" has appeared previously. Note that words within the conditional expression including "if", "for", and "while" are disregarded so that the line to be selected in Case 2 is other than the conditional expression itself.

In the above Case 1 or 2, when there is "{" or "}", a first line found to include the group 4 word of ";" is regarded as a transfer-destination even if it is not found after "if", "for", or "while". This may lead to generate extra controls blocks than there actually are. However, there is an advantage that all the transfer-destinations are reliably found using the relatively simple algorithm without missing any transfer-designation line.

Embodiment 3

Figure 12:
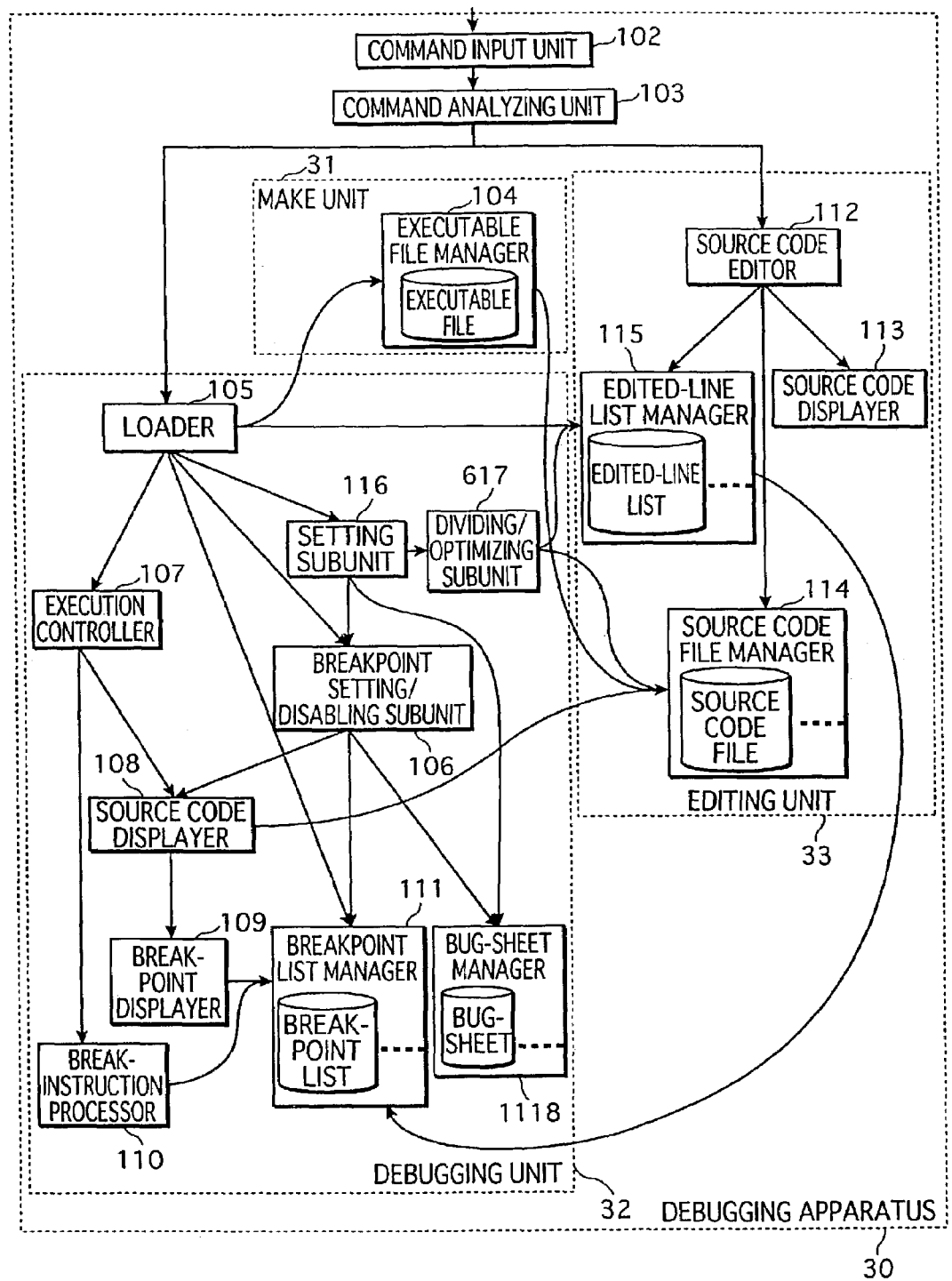
FIG. 12 is a block diagram showing a debugging apparatus 30 according to an embodiment 3 of the present invention.

FIG. 12 is a block diagram showing a debugging apparatus 30 according to an embodiment 3 of the present invention.

In the figure, the debugging apparatus 30 includes a bug-sheet list manager 1118 additionally to the components of the debugging apparatus 20. Hereinafter, description is given mainly to where the difference is found, while description to the construction similar to the debugging apparatus 20 is omitted.

FIG. 13 shows one example of a bug-sheet list.

The bug-sheet list includes a plurality of bug sheets, and each bug-sheet is composed of a bug-sheet number which uniquely identifies the bug-sheet, a comment, and an iteration number.

The comment is composed of the following information regarding at least one breakpoint. That is, the information regarding a name of the source code file including a line on which the breakpoint is set, a line number of the line, and a comment inputted by the operator. Each comment for a breakpoint is, for example, information about the edit made and is inputted by the operator upon setting the breakpoint. Further, such an arrangement may be made so that the comment may additionally include automatically inputted data such as an edit date and/or a time period taken for the edit.

The iteration number shows the number of times the instruction residing at the breakpoint is performed.

Figure 14:
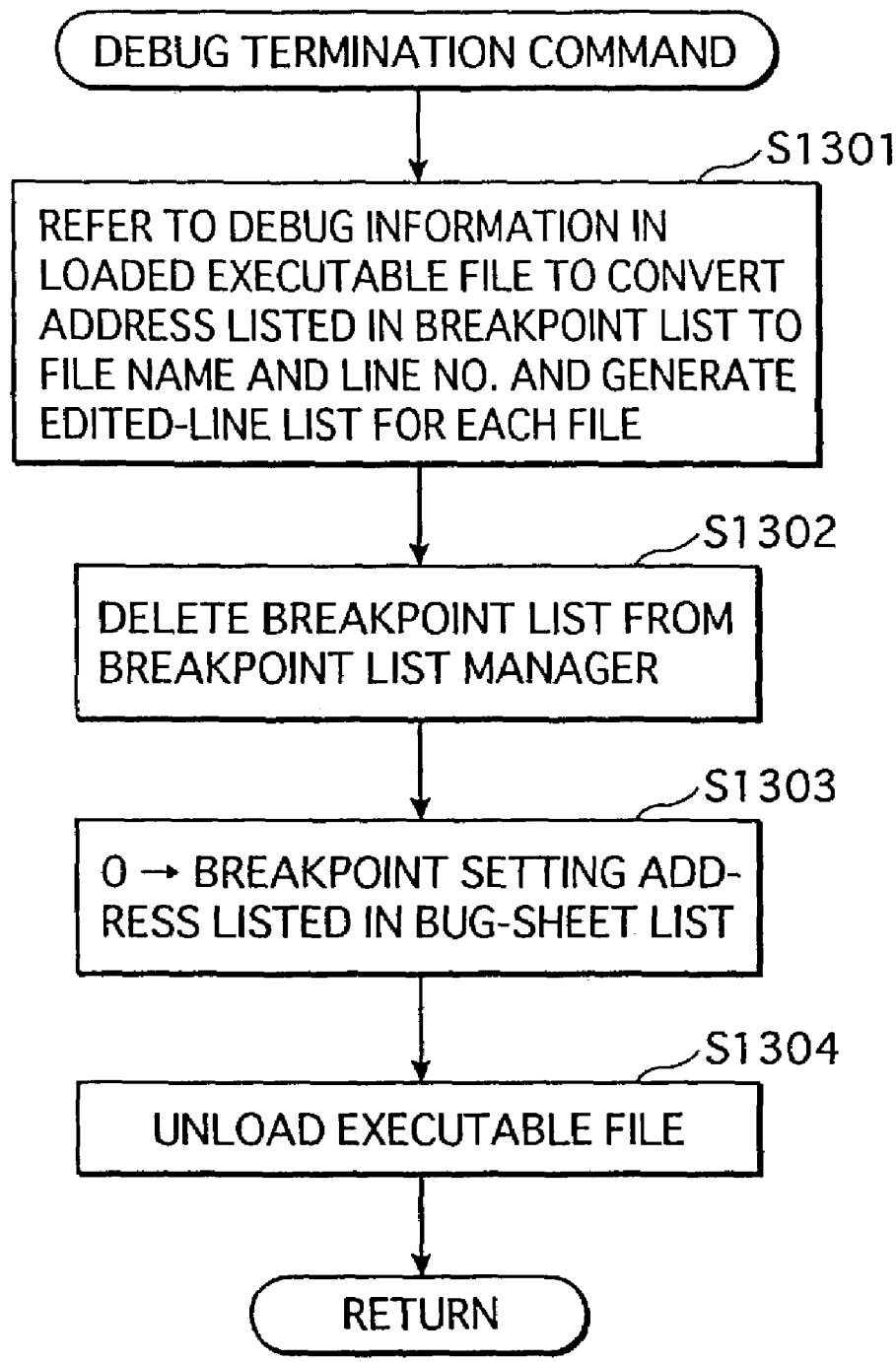
FIG. 14 is a flowchart showing processing performed in response to a debug termination command received by the command input unit 102.

FIG. 14 is a flowchart showing processing performed in response to a debug termination command received by the command input unit 102.

Step S1301: The loader 105 requests the edited-line list manager 115 to generate an edited-line list with reference to the breakpoint list stored in the breakpoint list manger 111. Next, the edited-line list manager 115 makes reference to the debug information in the loaded executable file so as to acquire a file name and a line number corresponding to each breakpoint listed in the breakpoint list. The edited-line list manager 115 then makes an edited-line list for each source code file.

Step S1302: The loader 105 requests the breakpoint list manger 111 to delete the breakpoint list, so that the breakpoint list manager 111 deletes the breakpoint list.

Step 1303: The loader 105 assigns 0 to each breakpoint address that is listed in the bug-sheet.

Figure 15:
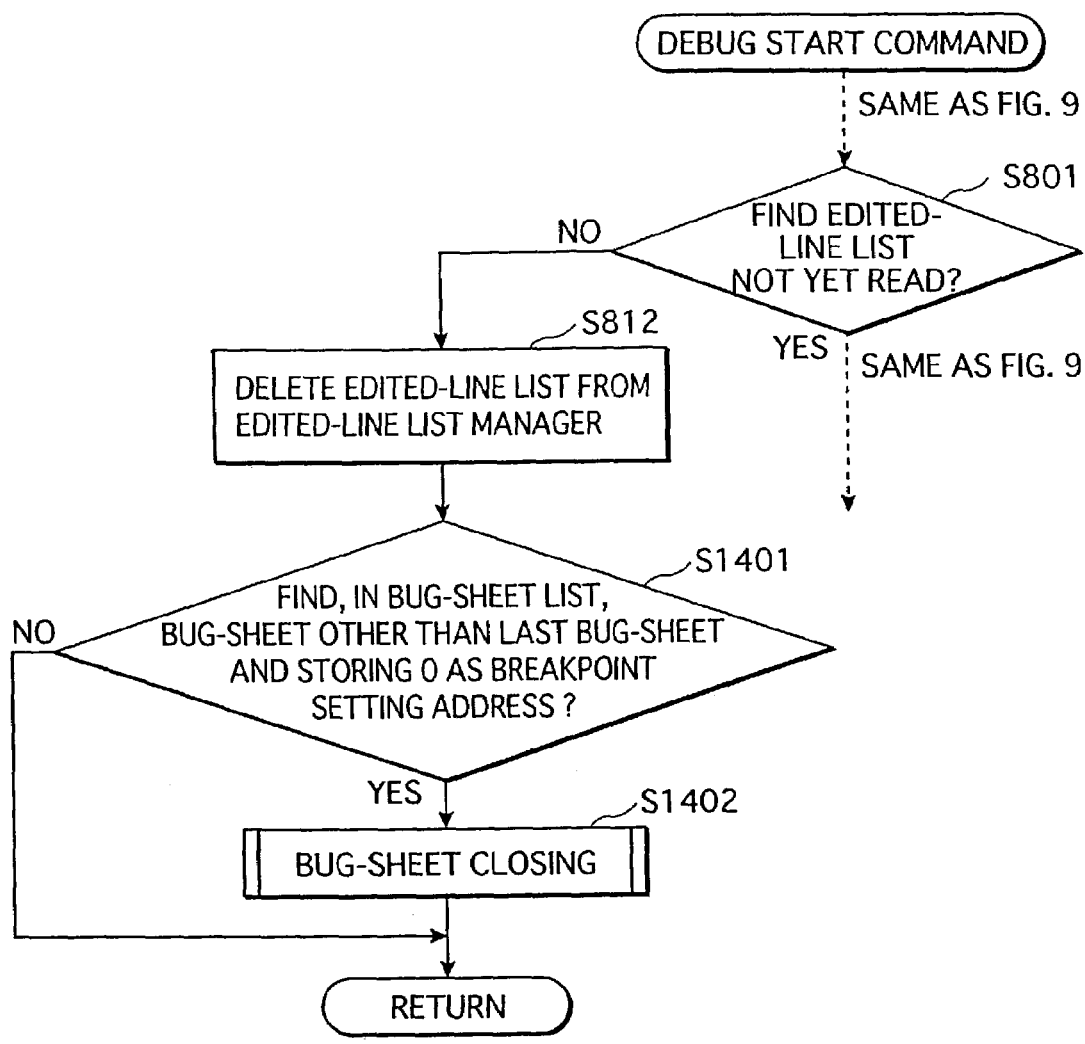
FIG. 15 is a flowchart showing processing performed in response to a debug start command received by the command input unit 102.

FIG. 15 is a flowchart showing processing performed in response to a debug start command received by the command input unit 102.

In the figure, the steps performed before the step S801 and after the judgment in the step S801 results in "Yes" as well as the step S812 are the same as their corresponding steps shown in FIG. 9. Thus, the flowchart in FIG. 15 is partially omitted. In addition, description to those same steps is omitted, and description is given below to steps S1401 and S1402, which are different steps than any of the steps shown in FIG. 9.

Step S1401: The loader 105 judges whether there is a bug-sheet, other than the last bug-sheet, with a breakpoint address listed therein holds the value 0.

Step S1402: When the judgment in the step S401 results in affirmative, the loader 105 performs the bug-sheet close processing shown in FIG. 18 for the bug-sheet.

Figure 16:
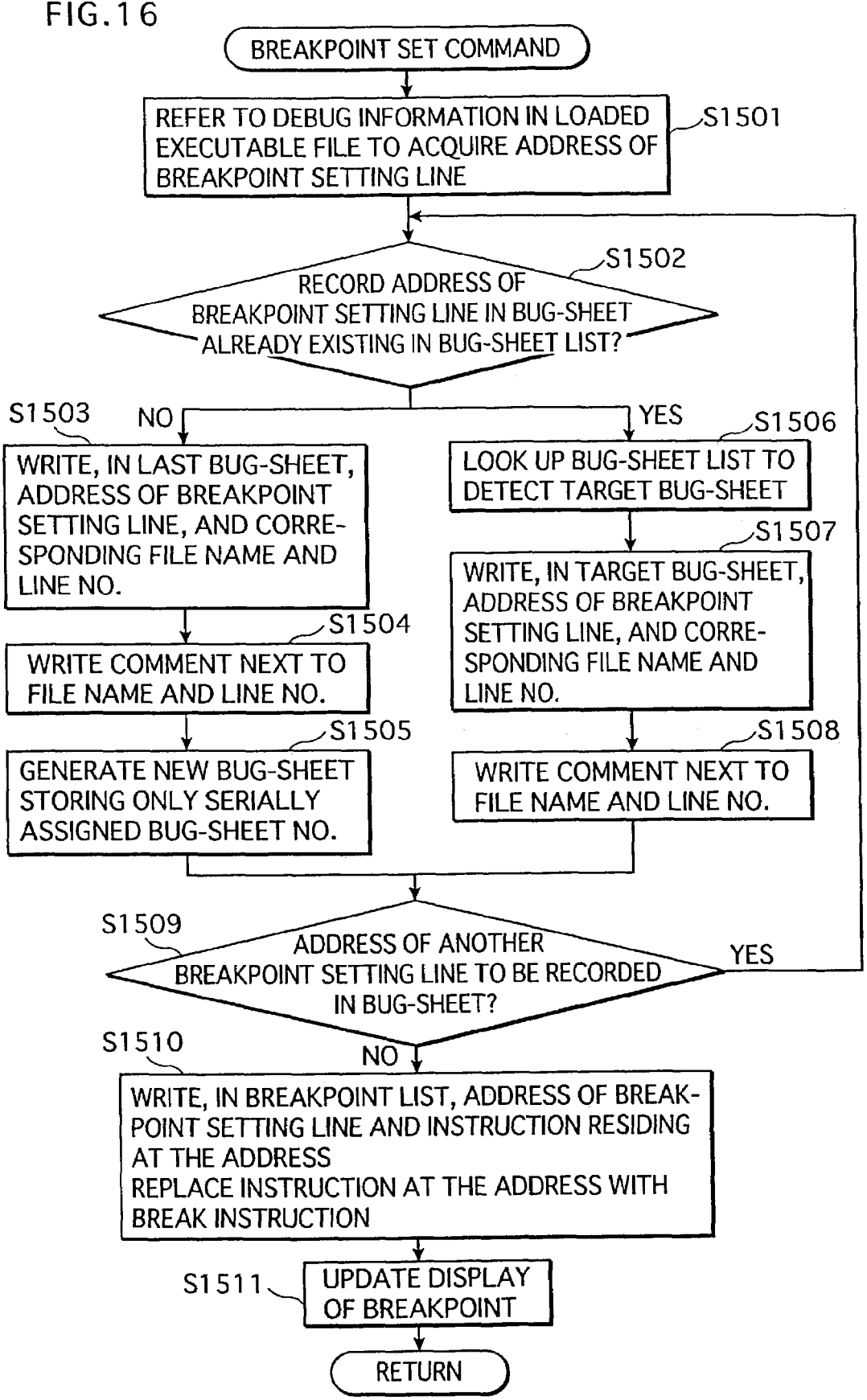
FIG. 16 is a flowchart showing processing performed in response to a breakpoint set command received by the command input unit 102.

FIG. 16 is a flowchart showing processing performed in response to a breakpoint set command received by the command input unit 102.

Step S1501: When the command input unit 102 receives a breakpoint set command, the loader 105 requests the breakpoint setting/disabling subunit 106 to set a breakpoint. In response, the breakpoint setting/disabling subunit 106 makes reference to the debug information in the loaded executable file to acquire the address specifying where in the executable file a line on which a breakpoint is to be set resides.

Step S1502: The bug-sheet list manager 1118 judges whether a bug-sheet into which the thus specified breakpoint address is to be recorded is a new bug-sheet which is not yet listed in the bug-sheet list.

Step S1503: When it is judged in the step S1502 that the bug-sheet to record the breakpoint address is a new one, the bug-sheet list manager 118 records the address of the breakpoint in the bug-sheet that is listed at the end of the bug-sheet list. In addition, the bug-sheet manager 118 records, in the bug-sheet, a file name and a line number corresponding to the breakpoint address.

Step S1504: The bug-sheet list manager 1118 records a comment inputted by the operator next to the thus recorded file name and line number.

Step S1505: The bug-sheet list manager 1118 generates a new bug-sheet at the end of the bug-sheet list. At this stage the newly generated bug-sheet only includes a bug-sheet number that is serially assigned.

Step S1506: When it is judged in the step S1502 that the bug-sheet to record the breakpoint address is one that is already listed in the bug-sheet list, the bug-sheet list manager 1118 looks up the bug-sheet list to detect the bug-sheet list targeted to record the breakpoint address.

Step S1507: The bug-sheet list manager 1118 writes the breakpoint setting address in the thus detected bug-sheet, and then writes a file name and a line number corresponding to the breakpoint address.

Step S1508: The bug-sheet list manager 1118 writes the comment inputted by the operator next to the thus written file name and line number.

Step S1509: The bug-sheet list manager 1118 judges whether there is another bug-sheet into which the breakpoint address is to be recorded.

Step S1510: The breakpoint list manager 111 records, into the breakpoint list, the breakpoint address along with an instruction located at the address, and then replaces the instruction with a break instruction.

Step S1511: The source code displayer 108 reads the requested source code file from the source code file manager 114 and displays the thus read file. The source code displayer 108 then requests the breakpoint displayer 109 to display breakpoints currently set in the specified file. In response, the breakpoint displayer 109 reads, from the breakpoint list manager 111, breakpoint information for the specified source code file and displays breakpoints according to the read information.

Figure 17:
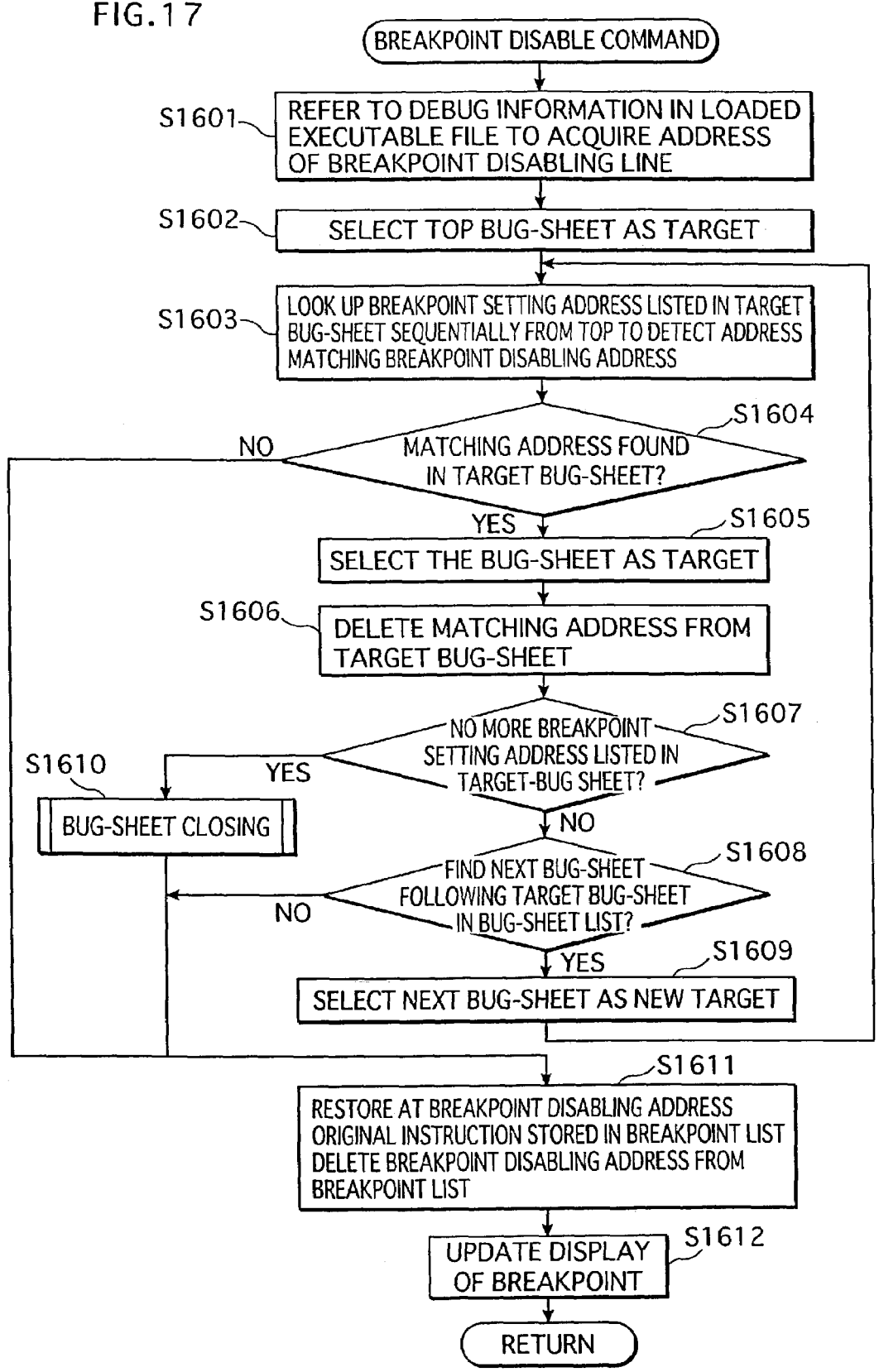
FIG. 17 is a flowchart showing processing performed in response to a breakpoint disable command received by the command input unit 102.

FIG. 17 is a flowchart showing processing performed in response to a breakpoint disable command received by the command input unit 102.

Step S1601: The loader 105 requests the breakpoint setting/disabling subunit 106 to disable a breakpoint specified by the command. In response, the breakpoint setting/disabling subunit 106 makes reference to the loaded executable file to acquire the address of the breakpoint to be disabled. The breakpoint setting/disabling subunit 106 then requests the bug-sheet list manager 1118 to delete, from a bug-sheet, the address of the breakpoint to be disabled. Next, the breakpoint setting/disabling subunit 106 requests the breakpoint list manager 111 to modify the breakpoint list so that the address of the breakpoint to be disabled is deleted along with the corresponding instruction. Finally, the breakpoint setting/disabling subunit 106 requests the source code displayer 108 to update the display so that the source code being displayed is consistent with the post-deletion source code.

Step S1602: The bug-sheet list manager 1118 selects, as a target, a bug-sheet listed at the top of the bug-sheet list.

Step S1603: The bug-sheet list manager 1118 then looks up the target bug-sheet to detect the address of the breakpoint to be disabled from among addresses of breakpoint lists recorded therein.

Step S1604: The bug-sheet list manager 1118 judges whether the address of the breakpoint to be disabled is detected in the step S1603 in the target bug-sheet.

Step S1605: When it is judged the address of the breakpoint to be disabled is detected in the target bug-sheet, the bug-sheet list manager 1118 selects the bug-sheet as a target.

Step S1606: The bug-sheet list manager 1118 deletes the address of the breakpoint to be disabled from the target bug-sheet.

Step S1607: The bug-sheet list manager 1118 judges whether the target bug-sheet no longer stores any address of a breakpoint.

Step S1608: When it is judged that the target but-sheet still stores an address of a breakpoint, the bug-sheet list manager 1118 further judges whether there is another bug-sheet next to the target bug-sheet.

Step S1608: When it is judged in the step S1608 that there is a next bug-sheet, the bug-sheet list manager 1118 now designates the next bug-sheet as a target.

Step S1610: When it is judged in the step S1607 that the target bug-sheet no-longer stores any address of a breakpoint, the bug-sheet list manager 1118 performs the bug-sheet close processing shown in FIG. 18.

Step S1611: The breakpoint list manager 111 restores an instruction that is originally located at the address of the breakpoint to be disabled, and then modifies the breakpoint list so that the address and the instruction are deleted.

Step S1612: The source code displayer 108 reads the specified source code file from the source code manager 114 to display. The source code displayer 108 then requests the breakpoint displayer 109 to display the breakpoints currently set in the specified source code file. In response, the breakpoint displayer 109 reads from the breakpoint list manger 111 breakpoint information for the specified file and displays breakpoints according to the read information.

Figure 18:
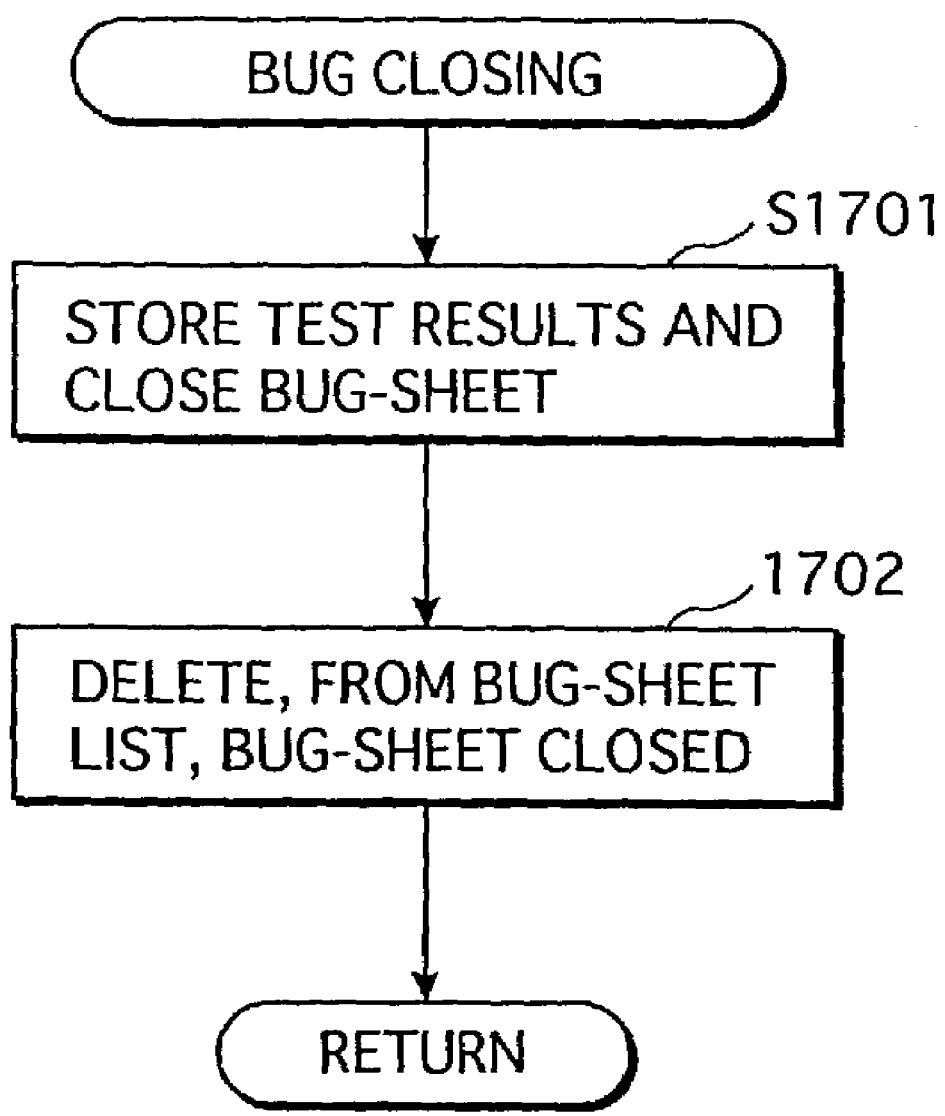
FIG. 18 is a flowchart showing bug-sheet close processing in detail.

FIG. 18 is a flowchart showing the bug-sheet close processing in detail.

Step S1701: The bug-sheet manager 118 stores the test results and then closes the bug-sheet.

Step S1702: The bug-sheet manager 118 then deletes the closed bug-sheet from the bug-sheet list.

With the above construction, the debugging apparatus 30 manages a bug-sheet separately for each breakpoint, which allows the programmer to describe the comment on the edit made with efficiency.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A breakpoint setting apparatus comprising:
a loading unit operable to load an object code generated correspondingly to a source code;
a storing unit operable to store information relating to the object code loaded by the loading unit and showing a relation between each of components constituting the source code and a corresponding location in the object code;
an acquiring unit operable to automatically acquire and store, when a specific edit is made to the source code corresponding to the object code loaded by the loading unit, editing information specifying a component subjected to the specific edit; and
a setting unit automatically setting, with reference to the information stored in the storing unit, a breakpoint in the object code at a location corresponding to the component specified by the editing information.

2. The breakpoint setting apparatus of claim 1, wherein each component is a line constituting the source code, and each line is uniquely identified by a line number assigned thereto,
the storing unit stores the relation between each line number of the source code and a corresponding location in the object code, and
the acquiring unit acquires as the editing information a line number identifying a line, in the source code, that is subjected to the specific edit.

3. The breakpoint setting apparatus of claim 2, wherein the specific edit is deletion of a line feed character, and
the breakpoint setting apparatus further comprising an updating unit operable to update, when the source code is edited to delete a line feed character, the editing information stored in the acquiring unit so that each line number greater than the specified line number is decremented by 1.

4. The breakpoint setting apparatus of claim 2, further comprising an updating unit operable to update, when the source code is edited to add a line feed character to a top of a line, the editing information stored in the acquiring unit so that each line number not less than a line number identifying the edited line is incremented by 1.

5. The breakpoint setting apparatus of claim 2, further comprising an updating unit operable to update, when the source code is edited to add line feed character to an end of a line, to editing information stored in the acquiring unit so that each line number greater than a line number identifying the edited line is incremented by 1.

6. The breakpoint setting apparatus of claim 2, wherein
the specific edit is addition of a line feed character to a middle of a line in the source code, and
the breakpoint setting apparatus further comprising an updating unit operable to update, when the source code is edited to add a line feed character to a middle of a line, the editing information stored in the acquiring unit so that each line number greater than the specified line number is incremented by 1, and that a line number obtained by adding 1 to the specified line number is additionally stored in the editing information.

7. The breakpoint setting apparatus of claim 2, wherein the specific edit is a modification of a character siring without any modification to a line feed character.

8. The breakpoint setting apparatus of claim 2, wherein the source code is made up of control blocks which in turn made up of a plurality of lines,
the acquiring unit further stores block-boundary information showing boundaries of each control block, each boundary being specified by a line number, and
the setting unit sets a breakpoint in the object code at a location corresponding to a first line of each control block shown by the block-boundary information.

9. The breakpoint setting apparatus of claim 2, wherein the setting unit sets, when the editing information stored in the acquiring unit includes a plurality of consecutive line numbers, a breakpoint in the object code only at a location corresponding to a first line number of the plurality line numbers.

10. The breakpoint setting apparatus of claim 2, wherein
the acquiring unit tinter stores block-boundary information showing boundaries of each control block, each boundary being specified by a line number, and
the setting unit sets a breakpoint in the object code only at location corresponding to a first specific edited line from the top of each control block.

11. The breakpoint setting apparatus of claim 1, further generates a bug-sheet for each breakpoint set by the setting unit and presents the generated bug-sheet to a user through a user interface, the bug-sheet including user-inputted information regarding an edit made to the source code at a component corresponding to the breakpoint.

12. The breakpoint setting apparatus of claim 11, further acquires from a debugger, upon the bug-sheet generation, a count of how many times the edited component of the source code is decoded and executed by the debugger, and presents to the user the count together with the user-inputted information.

13. The breakpoint setting apparatus of claim 1, wherein the acquiring unit stores the editing information specifying the component subjected to the specific edit only when no otter editing information specifying the same component is already acquired and stored.

14. A breakpoint setting method comprising:
a loading step of loading an object code generated correspondingly to a source code;
a storing step of storing information relating to the object code loaded by the loading step and showing relation between each of components constituting the source code and a corresponding location in the object code;
an acquiring step of automatically acquiring and storing when a specific edit is made to the source code corresponding to the object code loaded by the loading step, editing information specifying a component subjected to the specific edit; and
a setting step of automatically setting, with reference to the information stored in the storing step, a breakpoint in the object code at a location corresponding to the component specified by the editing information.

15. A breakpoint setting program comprising:
a loading step of loading an object code generated correspondingly to a source code;
a storing step of storing information relating to the object code loaded by the loading step and showing a relation between each of components constituting the source code and a corresponding location in the object code;
an acquiring step of automatically acquiring and storing, when a specific edit is made to the source code corresponding to the object code loaded by the loading step, editing information specifying a component subjected to the specific edit; and
a setting step of automatically setting, with reference to the information stored in the storing step, a breakpoint in the object code at a location corresponding to the component specified by the editing information.

16. In a computer system for writing and editing executable code, the improvement of an automatic breakpoint setting apparatus that can be activated during an editing/debugging operation, comprising
a storing unit operable to store a predetermined quantity of code to be edited;
a display unit operable to display at least a portion of the code stored by the storing unit to enable editing of the code by a programmer;
an acquiring unit operable to monitor any modifications to the displayed code on the display unit and to automatically acquire and store the modification and location of the modification relative to the initial stored predetermined quantity of code; and
a setting unit, responsive to the acquiring unit, to automatically set, with reference to the modification and location of the modification stored in the acquiring unit, a breakpoint in the resulting modified quantity of code indicative of the modification, whereby the computer system is enabled to provide a representation of the location and modification of the predetermined quantity of code automatically whoa a programmer edits the stored quantity of code without additional commands being entered by the programmer.

17. The breakpoint setting apparatus of claim 16 wherein the storing unit stores data showing a relationship between lines of source code and corresponding locations in object code and the setting unit automatically sets a breakpoint in the object code at a location corresponding to an address oft breakpoint setting line in the source code when the acquiring unit acquires editing information identifying a line in the source code that is modified.

18. The breakpoint setting apparatus of claim 17 further including a bug-sheet generator unit operable to generate a bug-sheet recording an address of each breakpoint settings line set by the setting unit, and presents the generated bug-sheet to a user trough a user interface, the bug-sheet including user-inputted information regarding an edit made to a line of source code corresponding to each set breakpoint.

19. The breakpoint apparatus of claim 17, wherein
the specific edit is deletion of a line feed character, and
the breakpoint setting apparatus further comprising an updating unit operable to update, when the source code is edited to delete a line feed character, the editing information stored in the acquiring unit so that each line number greater than the specified line number is decremented by 1.

20. The breakpoint setting apparatus of claim 17, wherein
the specific edit is addition of a line feed character to a middle of a line the source code, and
the breakpoint setting apparatus further comprising an updating unit operable to update, when the source code is edited to add a line feed character to a middle of a line, the editing information stored in the acquiring unit so that each line number greater than the specified line number is incremented by 1, and that a line number obtained by adding 1 to the specified line number is additionally stored in the editing information.

21. The breakpoint apparatus of claim 16 wherein the setting unit generates a transfer-destination line lint for setting a line number and a corresponding transfer-destination flag.

22. The breakpoint apparatus of claim 21 wherein the setting unit further divides a source code corresponding to a line number into one or more words as defined by a character or a character string divided by predetermined delimiters set automatically, without a command entered by a programmer, in generating the transfer-destination line list.

* * * * *

UNITED STATES PATENT AND TRADEMARK OFFICE
CERTIFICATE OF CORRECTION

PATENT NO. : 7,134,115 B2 Page 1 of 1
APPLICATION NO. : 10/358827
DATED : November 7, 2006
INVENTOR(S) : Kawai et al.

It is certified that error appears in the above-identified patent and that said Letters Patent is hereby corrected as shown below:

In the Claims:
In Claim 5, Column 17, line 46, after "add" --a-- should be inserted;
In Claim 5, Column 17, line 48, "to" should be --the--;
In Claim 7, Column 17, line 62, "siring" should be --string--;
In Claim 10, Column 18, line 14, "tinter" should be --further--;
In Claim 11, Column 18, line 22, after "unit" a comma --,-- should be inserted;
In Claim 14, Column 18, line 44, after "storing" a comma --,-- should be inserted;
In Claim 17, Column 19, line 31, "oft" should be --of a--;
In Claim 18, Column 19, line 37, "settings" should be --setting--;
In Claim 18, Column 20, line 2, "trough" should be --through--;
In Claim 21, Column 20, line 27, "lint" should be --list--.

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,134,115 B2
APPLICATION NO. : 10/358827
DATED : November 7, 2006
INVENTOR(S) : Kawai et al.

It is certified that error appears in the above-identified patent and that said Letters Patent is hereby corrected as shown below:

In the Claims:
In Claim 5, Column 17, line 46, after "add" --a-- should be inserted;
In Claim 5, Column 17, line 48, "to" should be --the--;
In Claim 7, Column 17, line 62, "siring" should be --string--;
In Claim 10, Column 18, line 14, "tinter" should be --further--;
In Claim 11, Column 18, line 22, after "unit" a comma --,-- should be inserted;
In Claim 14, Column 18, line 44, after "storing" a comma --,-- should be inserted;
In Claim 17, Column 19, line 31, "oft" should be --of a--;
In Claim 18, Column 19, line 37, "settings" should be --setting--;
In Claim 18, Column 20, line 2, "trough" should be --through--;
In Claim 21, Column 20, line 27, "lint" should be --list--.

Signed and Sealed this

Tenth Day of April, 2007

JON W. DUDAS
*Director of the United States Patent and Trademark Office*